United States Patent [19]

Kimura et al.

[11] Patent Number: 5,553,172
[45] Date of Patent: Sep. 3, 1996

[54] ELECTRONIC IMAGE PICKUP APPARATUS HAVING MOVABLE FOCUS SCREEN AND MOVABLE MIRROR AND WHICH IS CAPABLE OF MINIATURIZATION

[75] Inventors: Satoshi Kimura, Oome; Hideki Miyazaki, Fussa; Hiroto Shimizu, Komae; Kazuto Yamamoto, Akishima; Tsuyoshi Kato, Hamura, all of Japan

[73] Assignee: Casio Computer Co., Ltd., Tokyo, Japan

[21] Appl. No.: 346,353

[22] Filed: Nov. 29, 1994

Related U.S. Application Data

[63] Continuation of Ser. No. 986,247, Dec. 7, 1992, abandoned.

[30] Foreign Application Priority Data

| Dec. 11, 1991 | [JP] | Japan | 3-327586 |
| Sep. 24, 1992 | [JP] | Japan | 4-279440 |
| Oct. 9, 1992 | [JP] | Japan | 4-298091 |

[51] Int. Cl.$^6$ ...................................................... G06K 9/20
[52] U.S. Cl. ............................................................. 382/312
[58] Field of Search ....................................... 358/450, 479; 382/100, 284, 312, 317, 318, 319, 323; 355/44, 45; 354/161; H04N 1/04, 1/387

[56] References Cited

U.S. PATENT DOCUMENTS

| 4,013,876 | 3/1977 | Anstin | 235/151 |
| 4,074,324 | 2/1978 | Barrett | 358/296 |
| 4,367,533 | 1/1983 | Wiener | 364/519 |
| 4,513,325 | 4/1985 | Itoh | 358/280 |
| 4,679,096 | 7/1987 | Nagashima | 358/287 |
| 4,687,318 | 8/1987 | Shibasaki et al. | 355/5 |
| 4,706,077 | 11/1987 | Roberts et al. | 340/728 |
| 4,713,698 | 12/1987 | Takahashi et al. | 358/296 |
| 4,720,749 | 1/1988 | Satake | 358/280 |
| 4,733,271 | 3/1988 | Arai | 355/5 |
| 4,742,369 | 5/1988 | Ishii et al. | 358/441 |
| 4,821,335 | 4/1989 | Yamazaki et al. | 382/53 |
| 4,943,870 | 7/1990 | Sugishima | 358/451 |
| 5,016,194 | 5/1991 | Matsushita et al. | 364/519 |
| 5,040,072 | 8/1991 | Tsuji et al. | 358/228 |
| 5,051,833 | 9/1991 | Tsuji | 358/227 |
| 5,067,028 | 11/1991 | Ogura et al. | 358/494 |
| 5,095,511 | 3/1992 | Okazaki | 382/8 |
| 5,223,935 | 6/1993 | Tsuji et al. | 358/228 |

FOREIGN PATENT DOCUMENTS

| 0074794 | 3/1983 | European Pat. Off. | H04N 1/40 |
| 0196009 | 10/1986 | European Pat. Off. | G03B 19/02 |
| 0368664 | 5/1990 | European Pat. Off. | H04N 1/21 |
| 3411684C2 | 10/1984 | Germany | H04N 1/393 |

Primary Examiner—Leo Boudreau
Assistant Examiner—Andrew W. Johns
Attorney, Agent, or Firm—Frishauf, Holtz, Goodman, Langer & Chick

[57] ABSTRACT

An electronic image pickup apparatus picks up an object image such as an image on a blackboard and outputs the image. The apparatus can synthesize a picked-up image with format data input from another unit and output the synthesized image. When synthesis processing is to be performed, format data to be synthesized are created and stored in several line buffers in advance. When a picked-up one-line image signal is written in a line buffer of 1 line, the format data stored in the several line buffers are read out, and the image signal and the format data are synthesized in the line buffer of 1 line. By outputting the data in this line buffer in units of lines, the synthesized data obtained by synthesizing the picked-up image with the format data is output. A movable focus screen and a movable mirror are provided, along with a driving device for moving the focus screen and the mirror, in order to eliminate the need for a separate shutter plate, thus enabling miniaturization of the electronic image pickup apparatus.

23 Claims, 29 Drawing Sheets

FIG.5
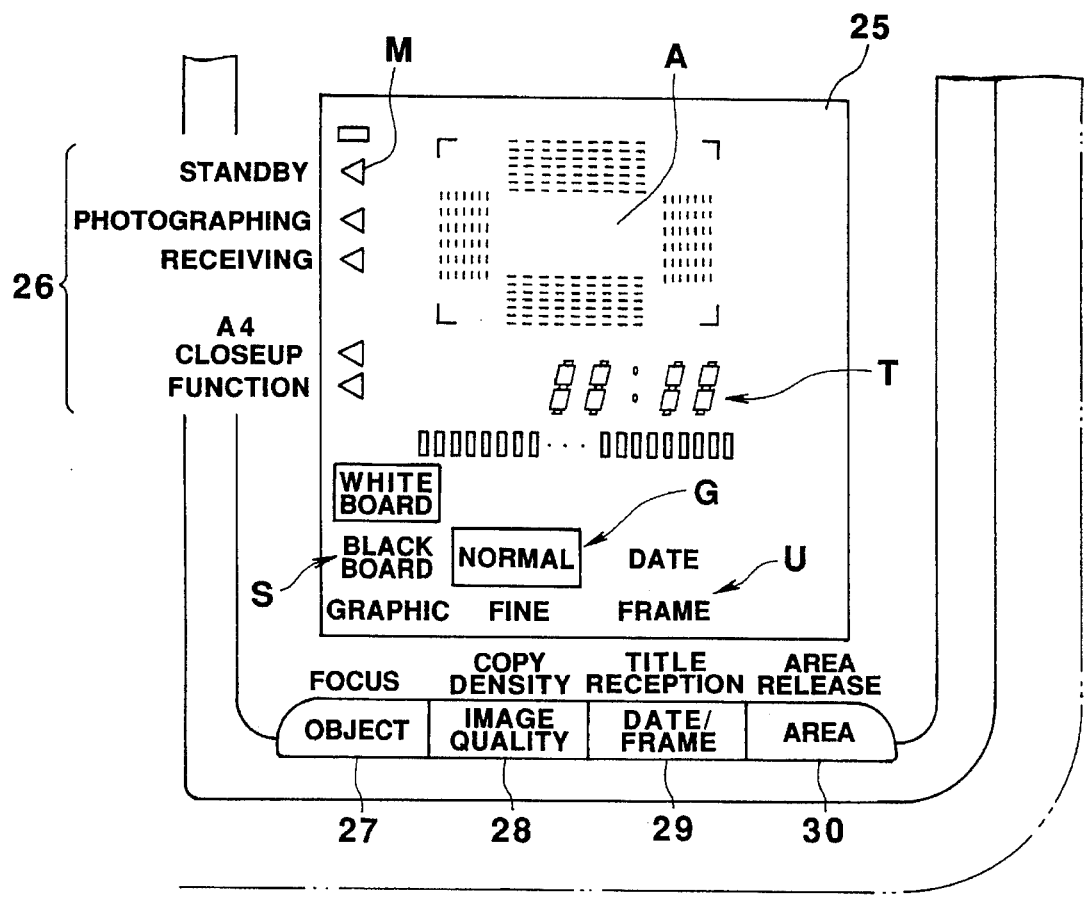
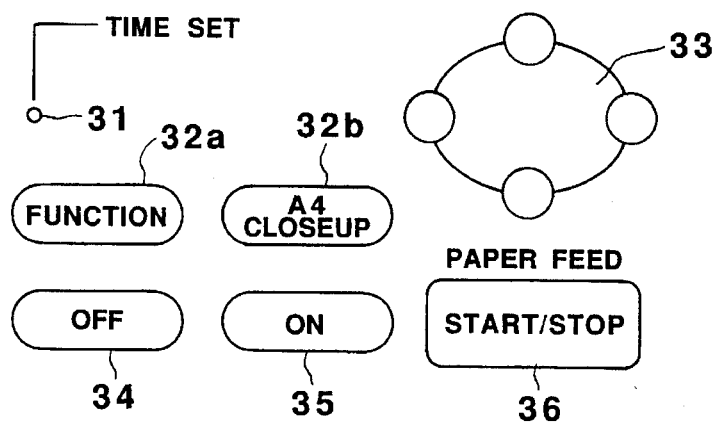

| 0 | 8 | 2 | 10 |
|---|---|---|----|
| 12 | 4 | 14 | 6 |
| 3 | 11 | 1 | 9 |
| 15 | 7 | 13 | 5 |

FIG.30

● SCHEDULE FOR DEVELOPMENT OF NEW PRODUCT USING ACCELERATION SENSOR "SUPER G"

SUPER G: LOW-FREQUENCY ACCELERATION SENSOR CONSISTING OF ONLY PLASTIC MATERIAL.

7/2 ～ DESIGN · TRIAL PRODUCTION

8/5 ～ ORDER

8/15 ～ TRIAL MASS PRODUCTION

9/1 ～ EVALUATION

9/25 MASS PRODUCTION START

FIG.31

| Lx-999 SCHEDULE·ORGANIZE MEETING | No. |
|---|---|
| ⊙ SCHEDULE FOR DEVELOPMENT OF NEW PRODUCT USING ACCELERATION SENSOR "SUPER G"<br>SUPER G: LOW-FREQUENCY ACCELERATION SENSOR CONSISTING OF ONLY PLASTIC MATERIAL.<br><br>7/2   DESIGN TRIAL PRODUCTION<br>~<br>8/5   ORDER<br>~<br>8/15  TRIAL MASS PRODUCTION<br>~<br>9/7   EVALUATION<br>~<br>9/25  MASS PRODUCTION START | PERSON IN CHARGE |
| REMARKS | |

ELECTRONIC IMAGE PICKUP APPARATUS HAVING MOVABLE FOCUS SCREEN AND MOVABLE MIRROR AND WHICH IS CAPABLE OF MINIATURIZATION

This application is a continuation of application Ser. No. 07/986,247, filed Dec. 7, 1992, now abandoned.

BACKGROUND OF THE INVENTION

1. Field of the Invention

The present invention relates to an electronic image pickup apparatus for picking up an object image such as an image on a blackboard, and outputting the image to a printer, for example.

2. Description of the Related Art

When an explanation is presented by using a blackboard at a meeting or the like, it is desired that the contents written on the blackboard should be easily recorded.

In order to meet such a desire, a blackboard having a copying function, a so-called electronic print board, has been used. A technique for such an electronic print board is disclosed in, e.g., U.S. Pat. Nos. 4,687,318 and 4,733,271.

Since such an electronic print board has a copying function itself, the apparatus inevitably has a large size. It is, therefore, difficult to move the apparatus between meeting rooms.

Under the circumstances, an electronic image pickup apparatus has been developed. In this known apparatus, an object image such as an image on a blackboard or the like is optically input upon size reduction, the reduced image is scanned by an image pickup device to obtain an image signal, and the image signal is recorded on recording paper. Since such an electronic image pickup apparatus is separated from a blackboard, the apparatus can be moved between meeting rooms. For example, a technique for this type of electronic image pickup apparatus is disclosed in U.S. Pat. Nos. 4,074,324 and 5,067,028.

The above-described electronic image pickup apparatus is designed to simply pick up an image on a blackboard or the like and print it. However, in order to simultaneously record synthesis data (to be synthesized), e.g., frame, date, and subject data, a user must additionally write them.

In order to eliminate such an inconvenience, some apparatus is designed to switch between a picked-up image and synthesis data by means of a switch so as to output synthesized image signals to a printing unit, as disclosed in, e.g., U.S. Pat. No. 4,013,876.

In this apparatus, however, since a picked-up image and synthesis data are switched by means of a switch, output synthesized image signals must be switched by the switch with high precision in accordance with the timing of the printing unit so as to perform time division inputting of two types of data, resulting in complicated timing control.

A page buffer may be used to create a synthesized print image corresponding to one page in advance. For this purpose, however, a one-page memory is required. In addition, a printing operation cannot be started until an image pickup operation of one frame is completed, and creation of a synthesized image is completed in the page buffer.

SUMMARY OF THE INVENTION

The present invention has been made in consideration of the above situation, and has as its object to provide an electronic image pickup apparatus which requires neither precise timing control nor a page buffer.

In order to achieve the above object, the present invention comprises image data creating means for creating image data in units of lines by forming an object image using an optical system and scanning an image formation plane using a line sensor, a line buffer for storing one-line image data created by the image data creating means, data generating means for generating data to be synthesized with the image data, in units of lines, synthesized data creating means for creating synthesized data by synthesizing the one-line data generated by the data generating means with the one-line image data created by the image data creating means in the line buffer, and synthesized data output means for outputting the synthesized data created by the synthesized data creating means.

According to the electronic image pickup apparatus of the present invention, image data are generated in units of lines, data to be synthesized with the image data are generated in units of lines, and both the data are synthesized in the line buffer to create synthesized data when a printing operation is to be performed on the basis of the synthesized data, since one-line synthesized data is created in advance, a synthesized image can be printed by sequentially transferring the synthesized data to a printer unit without requiring precise timing control.

In addition, since the electronic image pickup apparatus of the present invention is designed to synthesize image data and synthesis data (to be synthesized with the image data) with each other and output the synthesized data in units of lines, a one-page memory is not required, and printing of a synthesized image can be started on the basis of synthesized data sequentially output in units of lines before a photographing operation corresponding to one frame is completed.

According to a further feature of the invention, an electronic image pickup apparatus capable of miniaturization, comprises: an optical system having an image formation plane on which an object image is formed; image pickup means for picking up said object image on said image formation plane by moving said image formation plane of said optical system; a finder for monitoring said object image during a non-image picking up operation of said image pickup means; a focus screen movable to an image formation position where said object image is formed, and to a retreat position where said object image is retreated from said image formation position; a mirror movable to a reflection position where said object image formed on said focus screen is reflected on said finder, and to a shielding position where said finder is shielded; and driving means for respectively driving said focus screen and said mirror to said retreat position and said shielding position when an image picking up operation of said image pickup means is started, and for respectively driving said focus screen and said mirror to said image formation position and said reflection position when said image picking up operation is finished.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a plan view showing a liquid crystal display portion and the structure of its peripheral portion in the embodiment:

FIG. 30 is a view showing character information as an object to be photographed on a blackboard in the embodiment; and FIG. 31 is a view showing a recorded/printed state of the object in the embodiment.

DETAILED DESCRIPTION OF THE PREFERRED EMBODIMENTS

Figure 1:
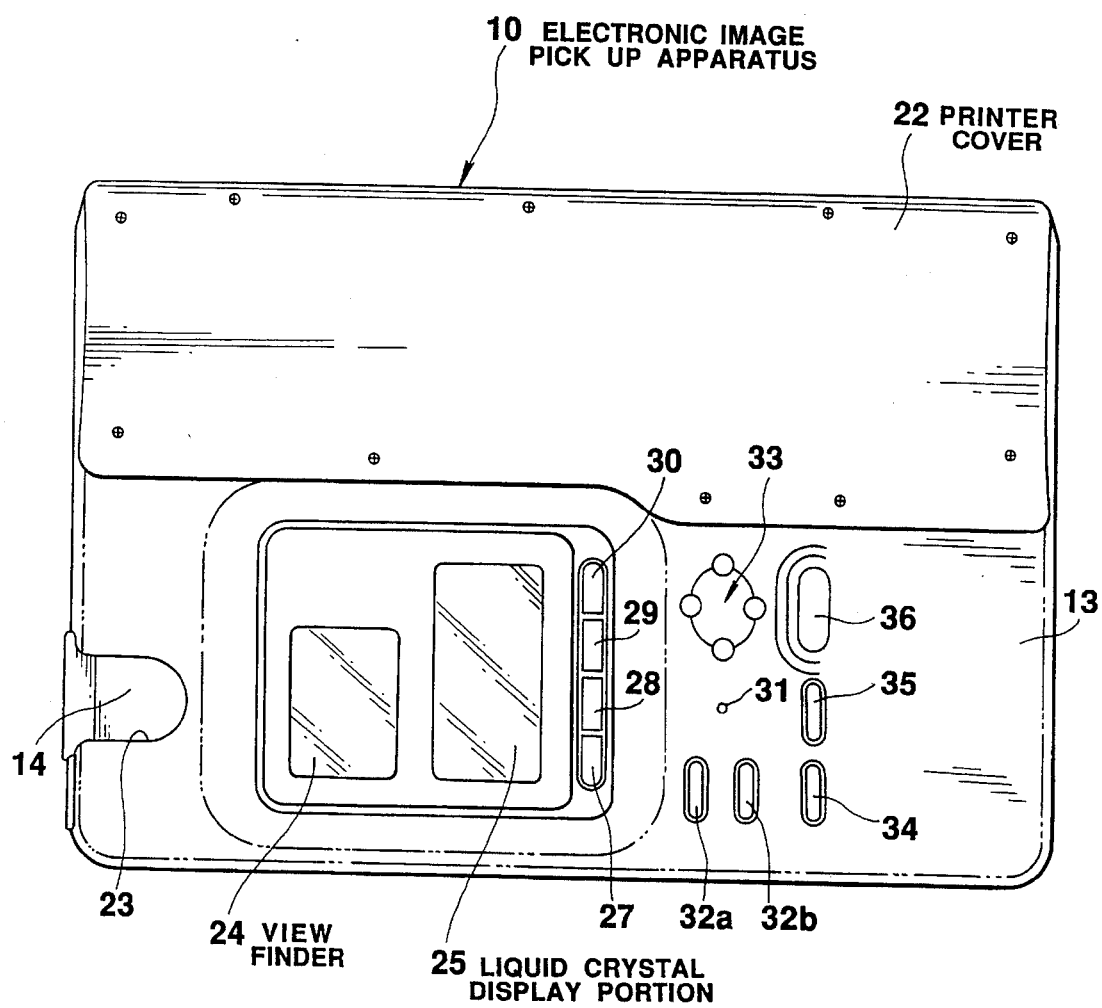
FIG. 1 is a plan view showing the outer appearance of the first embodiment of the present invention.
Figure 2:
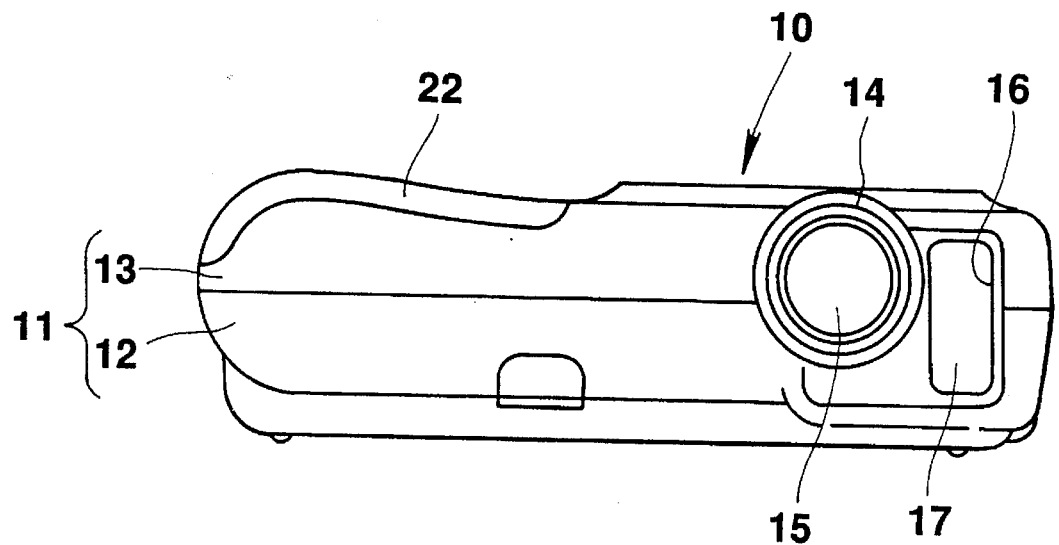
FIG. 2 is a right side view of the embodiment.

The first embodiment of the present invention will be described below. The overall arrangement of the embodiment will be described first. FIGS. 1 to 4 show the outer appearance of the embodiment. As shown in FIG. 2, an outer case 11 of an electronic image pickup apparatus 10 is constituted by a lower case 12 having an opening in its upper surface, and an upper case 13 having an opening in its lower surface and fitted with the upper case 13 of the lower case 12. A lens housing 14 extends from one side surface of the outer case 11. An image pickup lens 15 is fitted in the lens housing 14. In addition, a window portion 16 is formed near the lens housing 14 to pass infrared rays emitted from an infrared distance sensor (to be described later). A filter 17 is fitted in the window portion 16.

Figure 3:
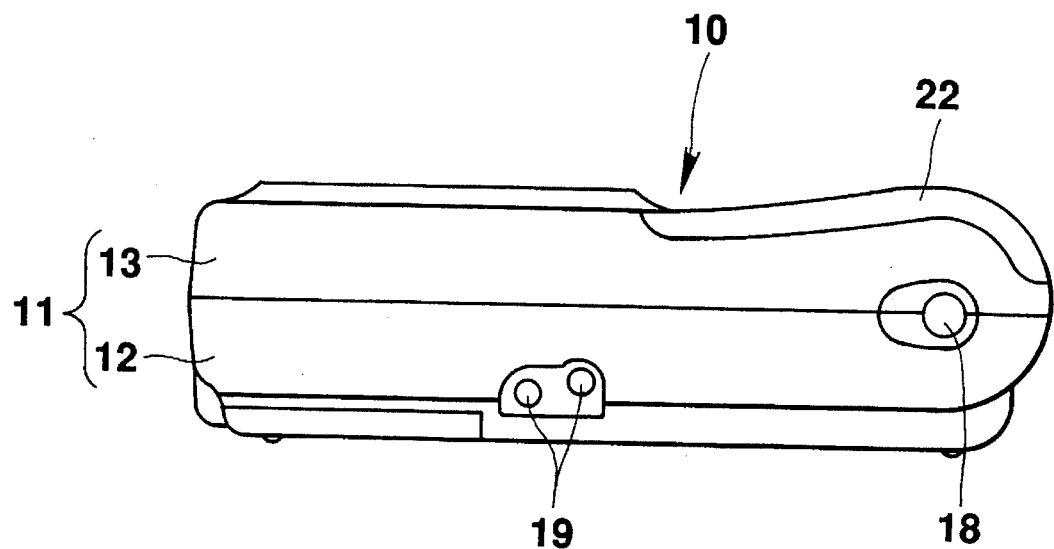
FIG. 3 is a left side view of the embodiment.
Figure 4:
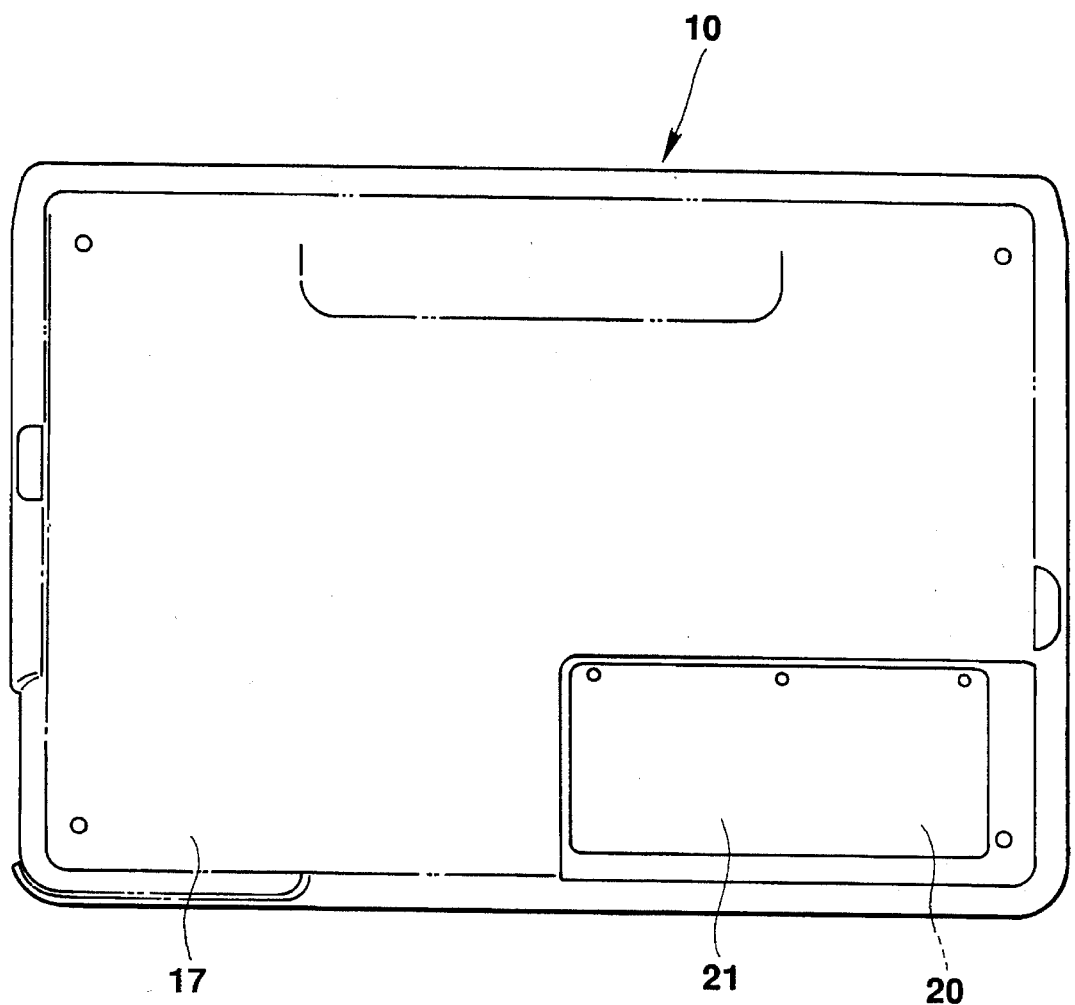
FIG. 4 is a bottom view of the embodiment.

As shown in FIG. 3, a hook switch 18 for turning on/off the main power supply of the electronic image pickup apparatus 10 is arranged on the other side surface of the outer case 11 together with a jack 19 used for connection with an external unit or the like. As shown in FIG. 4, a battery storage portion 20 is formed at one corner portion of the lower surface of the lower case 12. The battery storage portion 20 is covered with a detachable lid 21. On the other hand, as shown in FIG. 1, a printer cover 22 is mounted on one side portion of the upper surface of the upper case 13, while a notched portion 23 for exposing the lens housing 14, a viewfinder 24, a liquid crystal display portion 25, and a plurality of keys are formed on the other side portion.

FIG. 5 shows display contents on the liquid crystal display portion 25, specifically markers M which are turned on to display a state display 26 such as "standby", "photographing", and the like printed on a side portion of the liquid crystal display portion 25, an area display A indicating an area in which an image is picked up, a time display T, an image pickup mode display S consisting of three modes, i.e., "white board", "blackboard", and "graphic" modes, an image quality mode G consisting of two modes, i.e., "normal" and "fine" modes, a synthesis mode U consisting of two modes, i.e., "date" and "frame" modes, and the like. The following keys are arranged near the liquid crystal display portion 25: an object key 27 which is operated to select one of the modes of the image pickup mode display S; an image quality key 28 which is operated to select one of the modes of the image quality mode G; a date/frame key 29 which is operated to select one of the modes of the synthesis mode U; and an area key 30 which is operated to set or release an area designated by the area display A. In addition, on the upper case 13, the following keys are arranged: a set button 31 which is operated to set a time; a function key 32a which is operated in combination with another key to activate a predetermined function; an A4 closeup key 32b which is operated to perform a closeup operation corresponding to an A4 size; an area adjustment key 33 which is operated to change the area designated by the area display A; an OFF switch 34; an ON switch 35; a START/STOP key 36 which is operated to start printing of a picked-up image; and the like.

Figure 6:
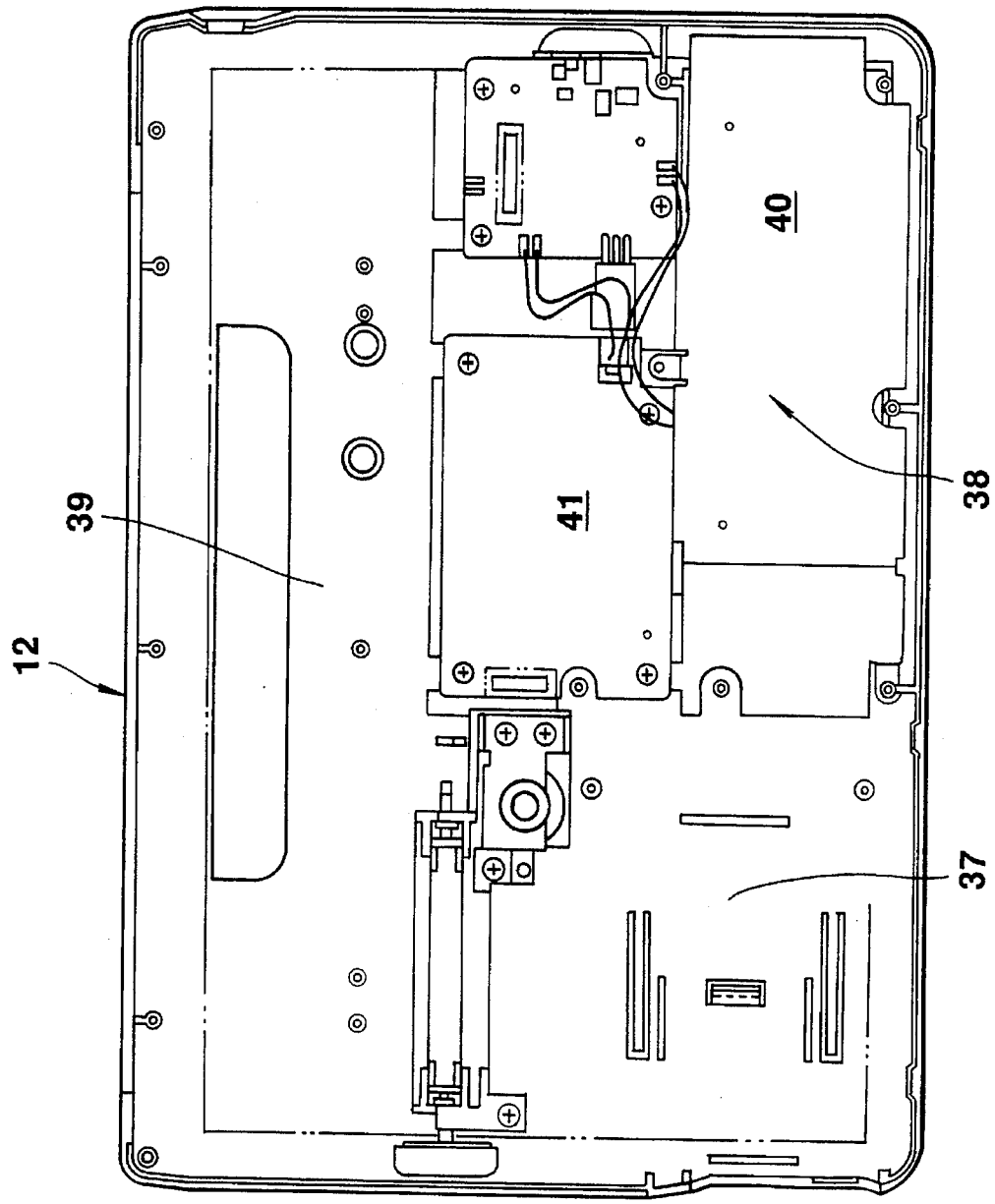
FIG. 6 is a plan view showing the internal arrangement of a lower case in the embodiment.
Figure 7:
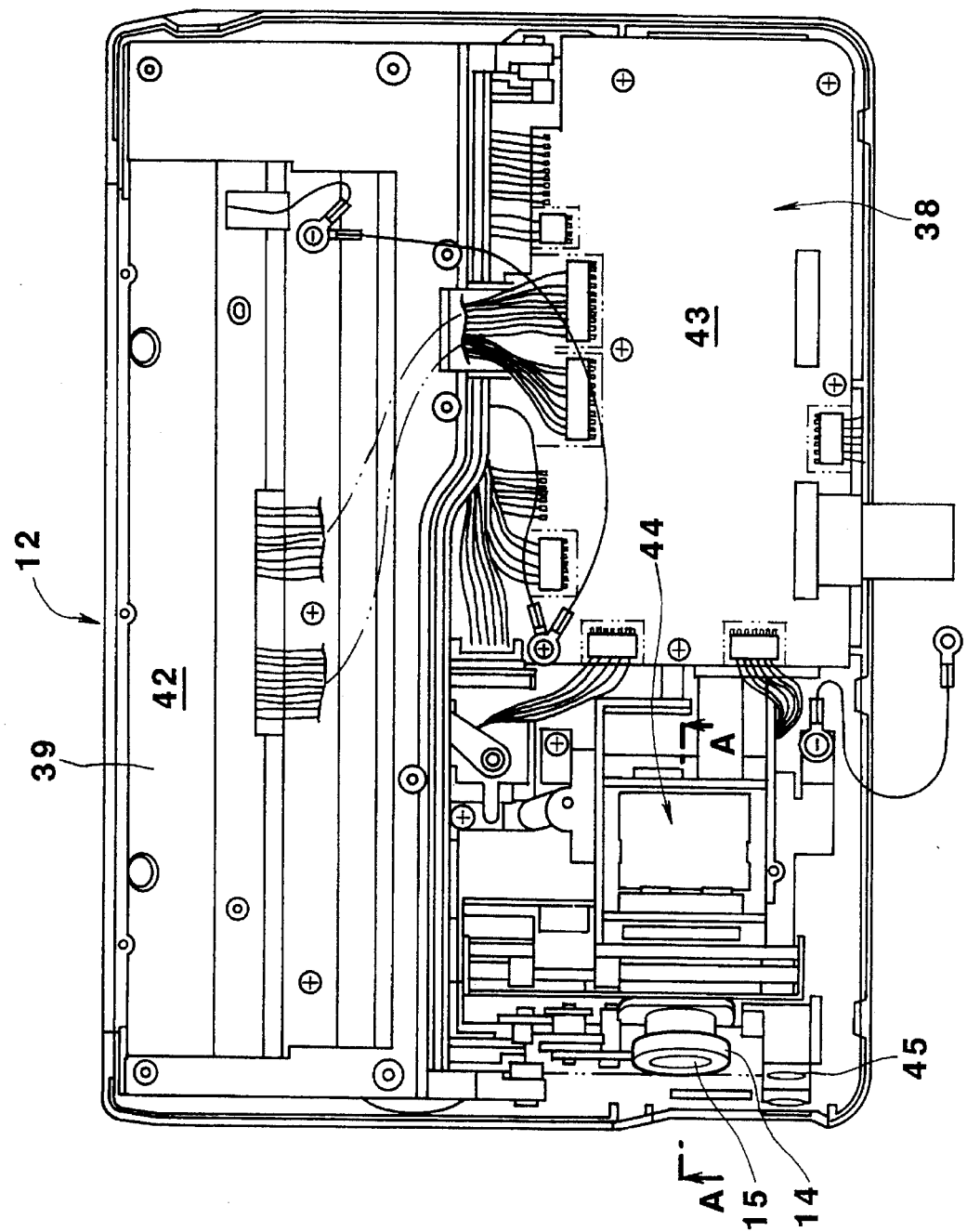
FIG. 7 is a plan view showing a state wherein various parts are mounted in the lower case.

As shown in FIG. 6, the interior of the lower case 12 is roughly divided into an autofocus (AF) arrangement portion 37, a board arrangement portion 38, and a printer arrangement portion 39. In the board arrangement portion 38, a shield pan 40 disposed on the upper surface of the battery storage portion 20, a power supply unit 41, and the like are arranged in advance. A printer 42 is arranged in the printer arrangement portion 39, as shown in FIG. 7. The printer 42 is of a thermal transfer scheme and includes a feed roller, a printer head, and the like (not shown). In the board arrangement portion 38, a circuit board 43 is arranged above the shield pan 40 and the power supply unit 41. All the control required for the image pickup apparatus is executed by a circuit and the like formed on the lower surface of the circuit board 43. An AF unit 44 is arranged in the AF arrangement portion 37. The lens housing 14 having the image pickup lens 15 is formed at an end portion of the AF unit 44. An infrared distance sensor 45 for detecting a distance to an object to be photographed is arranged at a side portion of the lens housing 14.

Figure 8:
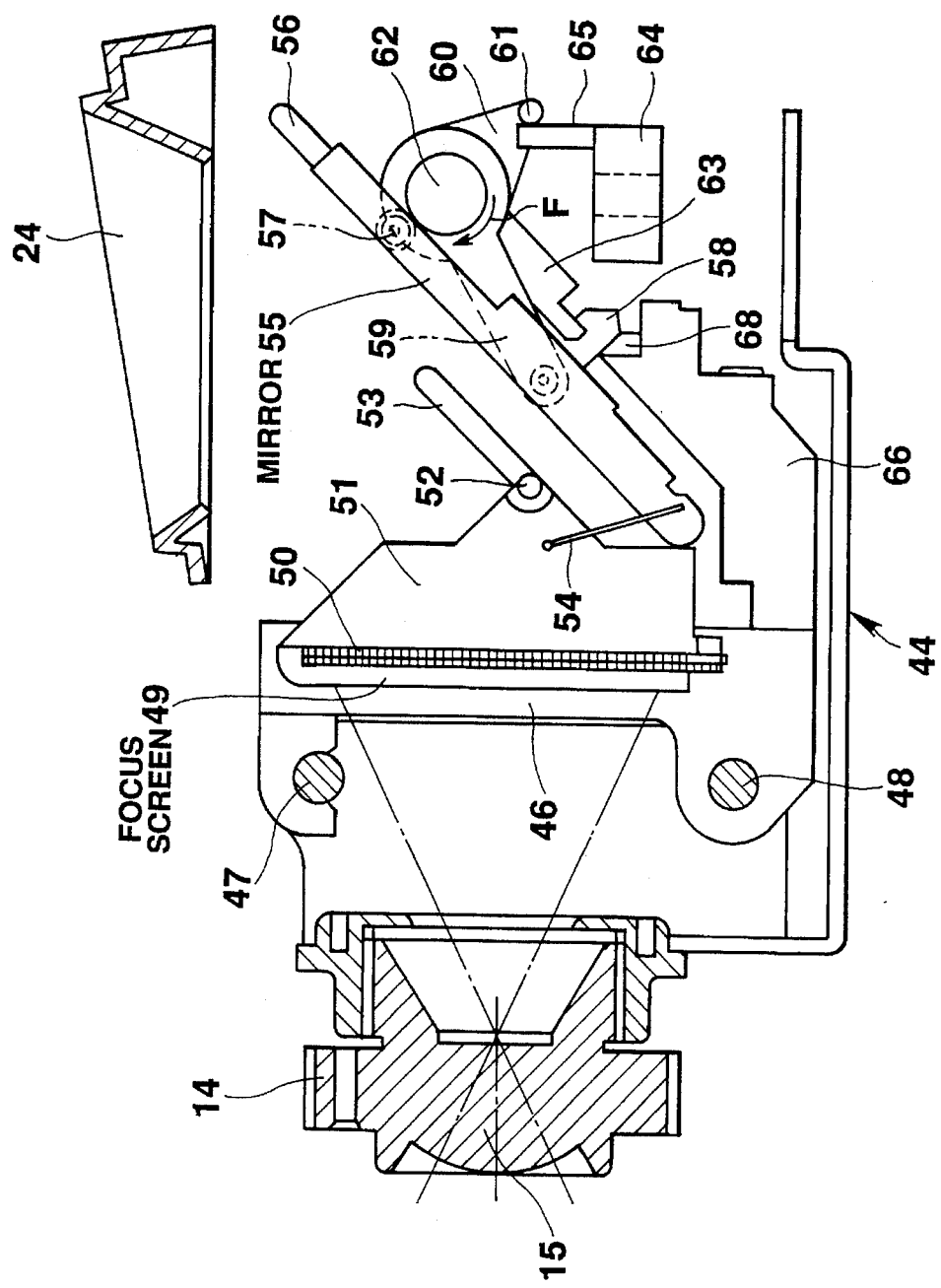
FIG. 8 is a sectional view taken along a line A—A in FIG. 7.

FIG. 8 is a vertical sectional view showing the internal structure of the AF unit 44, in which an image scanner 46 is arranged on the rear side of the image pickup lens 15. The image scanner 46 incorporates a line sensor 67 (see FIG. 10) constituted by vertically arranged charge coupled devices (CCDs). The image scanner 46 is designed to read a line of an object image in the vertical direction for every one-line step movement in the horizontal direction. For this purpose, the image scanner 46 is supported by a pair of horizontal bars 47 and 48 extending in the horizontal direction to be movable in the horizontal direction (see FIG. 10), and is located outside the image formation plane of the image pickup lens 15 during a non-image-pickup period.

A focus screen 49 and a liquid crystal device (LCD) 50 are disposed on a side of the image scanner 46. The focus screen 49 is located at the image formation plane of the image pickup lens 15. The LCD 50 is located on the rear surface side of the focus screen 49. Both the focus screen 49 and the LCD 50 are mounted on a frame member 51. A pin 52 extending in the horizontal direction is fitted in a rear end portion of the frame member 51. The pin 52 is loosely inserted in a first guide hole 53 obliquely formed in a side wall of the AF unit 44. One end of a link 54 is pivotally supported by the frame member 51, while the other end of the link 54 is pivotally supported by a lower end portion of a mirror 55 for reflecting light from the focus screen 49 and the LCD 50 onto the viewfinder 24. A pin 57 extends from an upper end portion of the mirror 55. The pin 57 is loosely inserted in a second guide hole 56 parallel to the first guide hole 53.

A hook 58 is formed in a middle portion of the mirror 55 to extend from the rear surface side, while one end of a first arm 59 is pivotally supported by the middle portion. A second arm 60 is integrally formed on the other end of the first arm 59 to extend in a direction almost perpendicular to the first arm 59. A projection 61 is formed on the distal end of the second arm 60 to extend in the horizontal direction. The member obtained by integrating the first and second arms 59 and 60 is pivotally supported on the side wall by a shaft 62 and is biased in the clockwise direction in FIG. 8 by a biasing force F of a spring (not shown) wound around the shaft 62.

The hook 58 is releasably locked at a lower end portion of a locking member 63. The locking member 63 is fixed at a predetermined position on the AF unit 44. A cam 64 is arranged below the second arm 60. Similar to the locking member 63, the cam 64 is supported at a predetermined position on the AF unit 44 to be horizontally rotatable. As is apparent from FIG. 10, a protruding piece 64a radially extends from the outer periphery of the cam 64, and an upright portion 65, which is brought into contact with the projection 61, is formed on a proximal portion of the protruding piece 64a.

Figure 10:
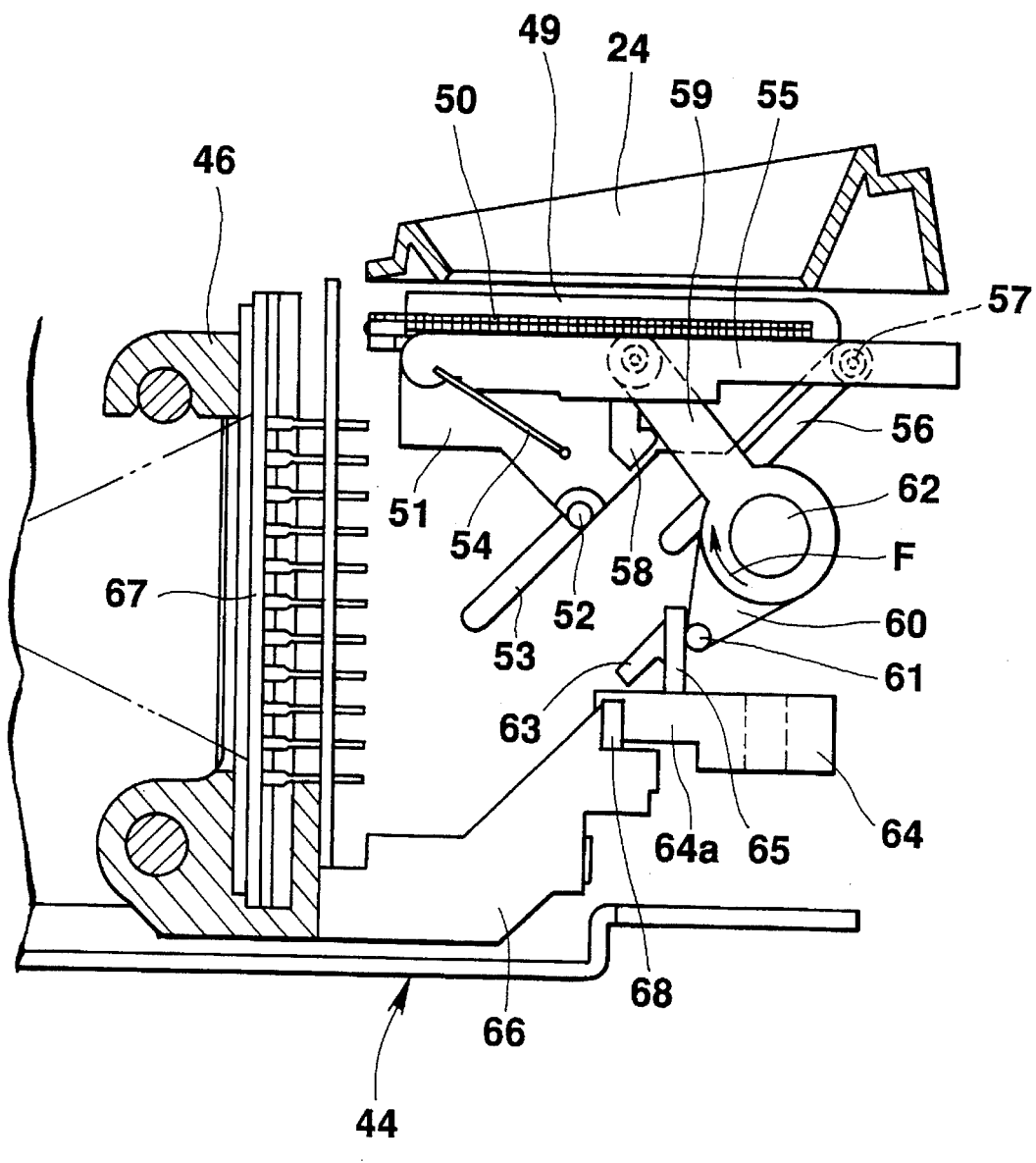
FIG. 10 is a sectional view taken along the line A—A in FIG. 7, showing a state wherein the focus plate and the mirror reach the retraction position and the light-shielding position, respectively.

A slide block 66 is disposed below the mirror 55. As shown in FIG. 10, the slide block 66 is coupled to a lower end portion of the image scanner 46 so that when the image scanner 46 is moved, the slide block 66 is integrally moved in the horizontal direction along the parallel bars 47 and 48. An edge 68 is formed on an upper end portion of the slide block 66. The edge 68 interferes with the hook 58 upon movement of the slide block 66, thus releasing the hook 58 from the distal end portion of the locking member 63.

In the embodiment having the above-described arrangement, when the image scanner 46 is in a non-image-pickup state, it is located on a side of the focus screen 49 (outside the image formation plane of the image pickup lens 15). At this time, as shown in FIG. 8, the hook 58 is engaged with the locking member 63. Therefore, the mirror 55 is held in an oblique position as a reflecting position by support at two points, i.e., at the pin 57 loosely inserted in the second guide hole 56 and the hook 58, and the rotation of the first arm 59 having the distal end pivotally supported by the mirror 55 is inhibited against the biasing force F of the spring.

The frame member 51 pivotally supported on the lower end portion of the mirror 55 through the link 54 is held in a vertical position by the link 54 at rest and the pin 52 located at the lower end portion of the first guide hole 53. With this structure, the focus screen 49 mounted on the frame member 51 is held in a vertical position as an image formation position as shown in FIG. 8, while the LCD 50 is held in a vertical position in the same manner. As a result, the object image picked by the image pickup lens 15 is formed on the focus screen 49 at the image formation position. The formed object image and the data displayed on the LCD 50 are reflected onto the viewfinder 24 by the mirror 55. Therefore, the object image can be visually checked through the viewfinder 24, and the data displayed on the LCD 50 can also be visually checked.

When the START/STOP key 36 is operated to print out the object image upon visually checking it through the viewfinder 24, a motor (not show) is started, and the image scanner 46 starts moving in the horizontal direction (from a lower position to an upper position in FIG. 8) along the parallel bars 47 and 48. Therefore, the slide block 66 also starts moving integrally with the image scanner 46. As a result, the edge 68 formed on the upper end portion of the slide block 66 interferes with the hook 58, releasing the hook 58 from the locking member 63.

Figure 9:
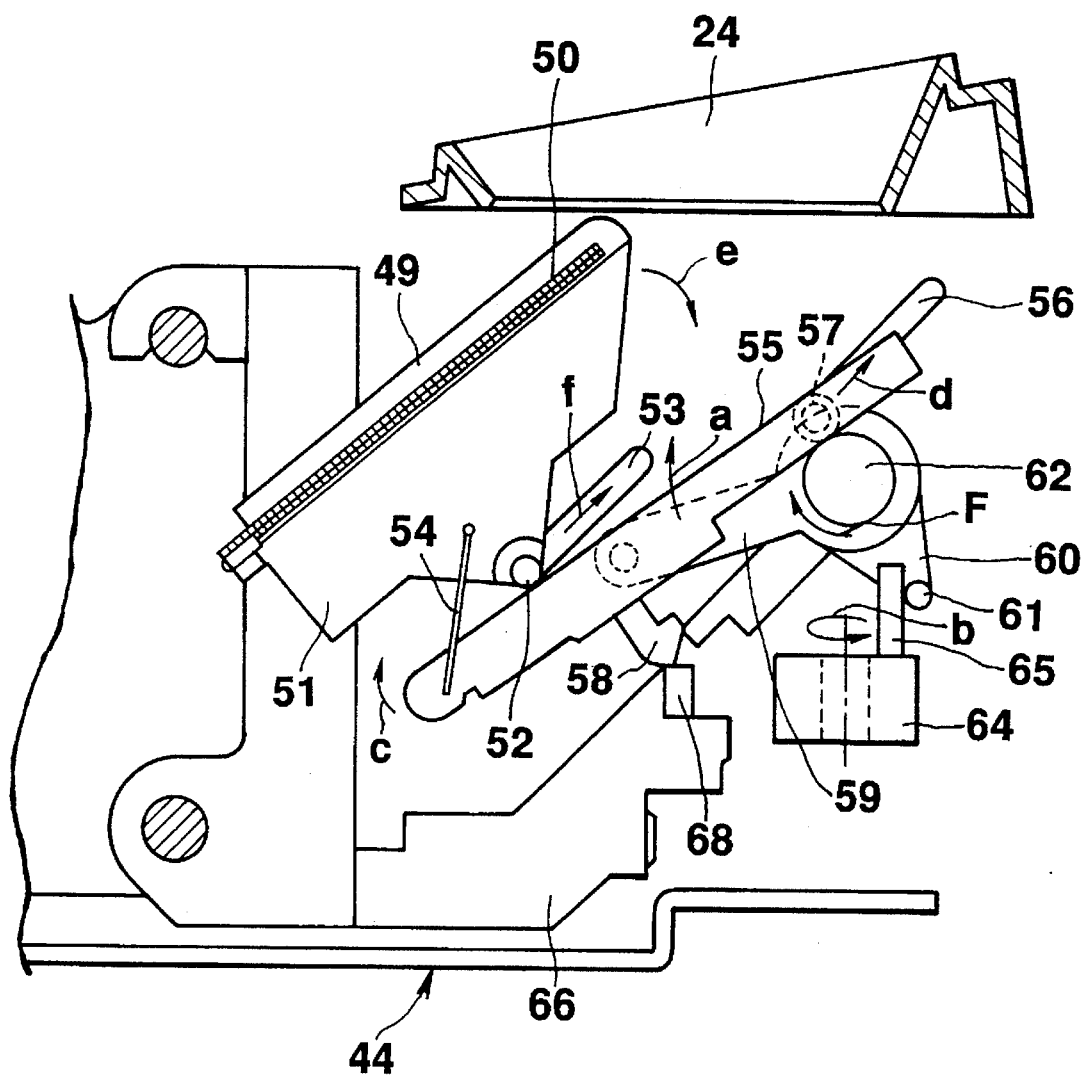
FIG. 9 is a sectional view taken along the line A—A in FIG. 7, showing a state wherein a focus plate is displaced from an image formation position to a retraction position, and a mirror is displaced from a reflecting position to a light-shielding position.

Since the first and second arms 59 and 60 are biased clockwise by the biasing force F of the spring, as described above, the two arms 59 and 60 start rotating in the same direction (an arrow a) at the same time when the hook 58 is released from the locking member 63, as shown in FIG. 9. At this time, the cam 64 is in a free state and is freely pivoted (an arrow b) when the projection 61 is brought into contact with the upright portion 65, so that pivoting of the second arm 60 is not interfered.

When the first arm 59 is pivoted, a substantially middle portion of the mirror 55 is pushed upward. As a result, the lower end portion of the mirror 55 is pivoted upward (an arrow c) about the pin 57, and the mirror 55 is moved upward while the pin 57 is moved along the second guide hole 56 (an arrow d). When the lower end portion of the mirror 55 is pivoted in this manner, the frame member 51 is pushed upward by the link 54 so that the upper end portion of the frame member 51 is pivoted downward (an arrow e) about the pin 52. At the same time, the frame member 51 is moved upward along the first guide hole 53 while the pin 52 is moved along the first guide hole 53 (an arrow f).

when the pin 52 reaches the upper end portion of the first guide hole 53, and the pin 57 reaches the upper end portion of the second guide hole 56, as shown in FIG. 10, pivoting of the first and second arms 59 and 60, the mirror 55, the frame member 51, and the focus screen 49 and the LCD 50 mounted on the frame member 51 is inhibited by support at two points, i.e., the pins 52 and 57. In this state, the mirror 55 reaches a light-shielding position to cover the lower surface of the viewfinder 24, and the focus screen 49 and the LCD 50 are stacked on the mirror 55 to be set in a retracting state. Therefore, external disturbing light from the viewfinder 24 side is shielded by the mirror 55 so as to allow the image scanner 46 to read only light from the image pickup lens 15 side with high precision.

The focus screen 49 retracts from the image formation plane of the image pickup lens 15 together with the LCD 50 to ensure a path through which the image scanner 46 can be moved along the image formation plane so that the image scanner 46 is moved in the horizontal direction without being interfered and can be moved from an initial position on one end portion side of the image formation plane to the other end portion side of the image formation plane. At this time, since the line sensor 67 is held in an OFF state, when the image scanner 46 is moved from one end portion side of the image formation plane to the other end portion side, no object image is picked up. When the image scanner 46 reaches the other end portion side of the image formation plane, the line sensor 67 is turned on, and the motor is rotated in the reverse direction to move the image scanner 46 from the other end portion side of the image formation plane to one end portion side as the initial position (from an upper position to a lower position in FIG. 10). With this operation, the line sensor 67 vertically scans the image formation plane to sequentially output image data every time the image scanner 46 is horizontally moved by one step when this image data is transferred to the printer 42, the printer 42 sequentially prints the object image. When the image scanner 46 reaches the other end portion side of the image formation plane, print of one-frame image data is completed.

Figure 11:
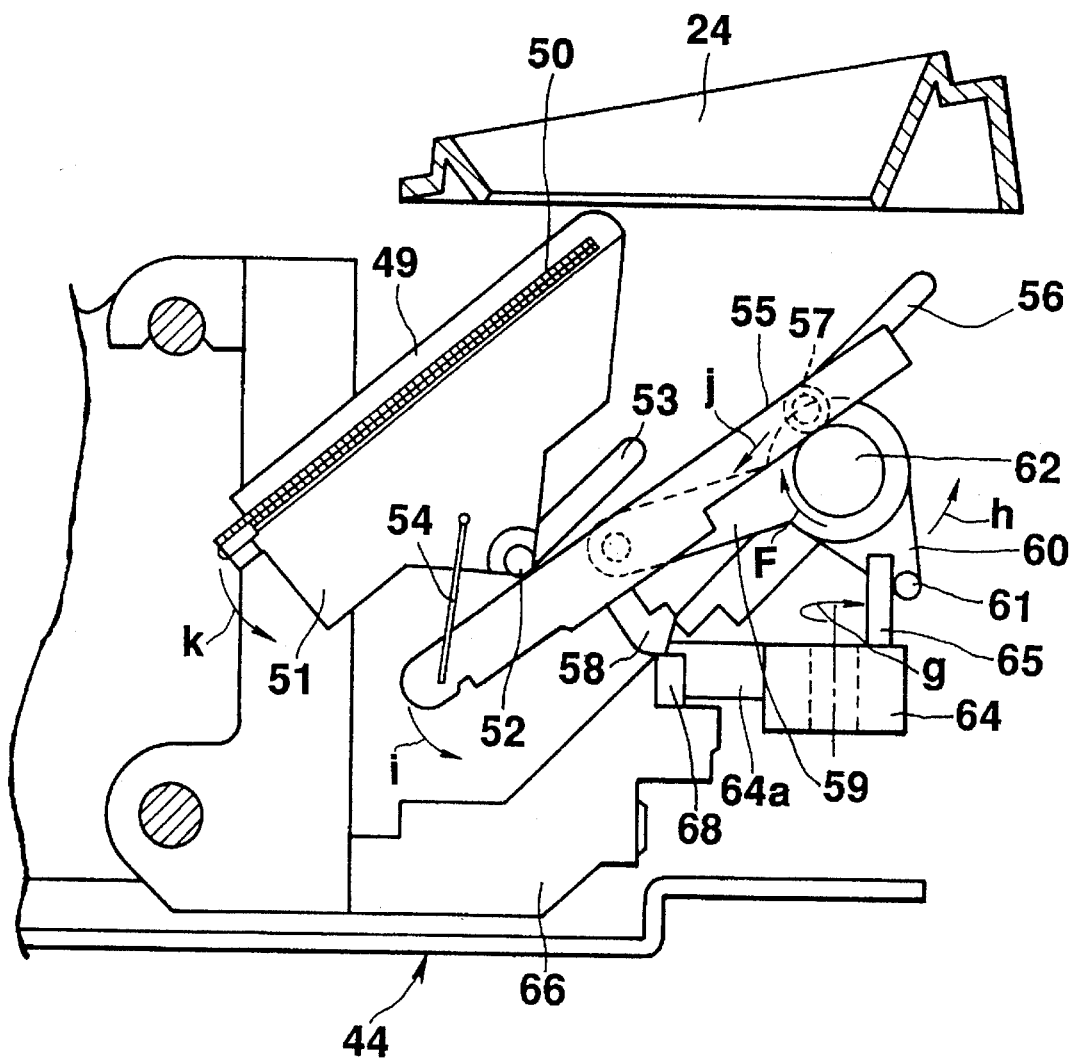
FIG. 11 is a sectional view taken along the line A—A in FIG. 7, showing a state wherein the focus plate is displaced from the retraction position to the image formation position, and the mirror is displaced from the light-shielding position to the reflecting position.

Even when print of one-frame image data is completed in this manner, the image scanner 46 continuously receives a driving force from the motor to be moved in the same direction. As a result, as shown in FIG. 10, the top portion of the slide block 66 is brought into contact with the protruding piece 64a extending from the cam 64. Consequently, as shown in FIG. 11, the cam 64 is driven in the reverse direction (an arrow g) to that described above, so that the upright portion 65 formed on the cam 64 is brought into contact with the projection 61 of the second arm 60, and the second arm 60 is pivoted counterclockwise (an arrow h) against the biasing force F of the spring.

When the second arm 60 is pivoted in this manner, the first arm 59 is also integrally pivoted counterclockwise. As a result, substantially the middle portion of the mirror 55 is pushed downward, and the lower end portion thereof is pivoted downward (an arrow i) about the pin 57. At the same time, the mirror 55 is moved downward while the pin 57 is moved along the second guide hole 56 (an arrow j). In addition, when the lower end portion of the mirror 55 is pivoted, the link 54 of the frame member 51 is pulled downward, and the lower end portion of the frame member 51 is pivoted downward (an arrow k) about the pin 52. At the same time, the frame member 51 is moved downward along the first guide hole 53 while the pin 52 is moved along the first guide hole 53.

When the focus screen 49 reaches the initial image formation plane, and the mirror 55 reaches the initial reflecting position, the hook 58 is engaged with the distal end portion of the locking member 63 again, and at the same time, the motor is stopped to stop the image scanner 46, as shown in FIG. 8. As described above, the mirror 55 is held in the oblique reflecting position by support at two points, i.e., at the pin 57 loosely inserted in the second guide hole 56 and the hook 58, and the frame member 51 pivotally supported on the lower end portion of the mirror 55 through the link 54 is held in a vertical position by support at two points, i.e., at the link 54 at rest and the pin 52 located at the lower end portion of the first guide hole 53. Therefore, the focus screen 49 mounted on the frame member 51 is held in the vertical image formation position, as shown in FIG. 8, while the LCD 50 is held in a vertical position in the same manner, thus allowing visual checking of the object image through the viewfinder 24 and the data displayed on the LCD 50 again.

The circuit arrangement of the first embodiment having the above-described structure will be described next with reference to the accompanying drawings.

Figure 12:
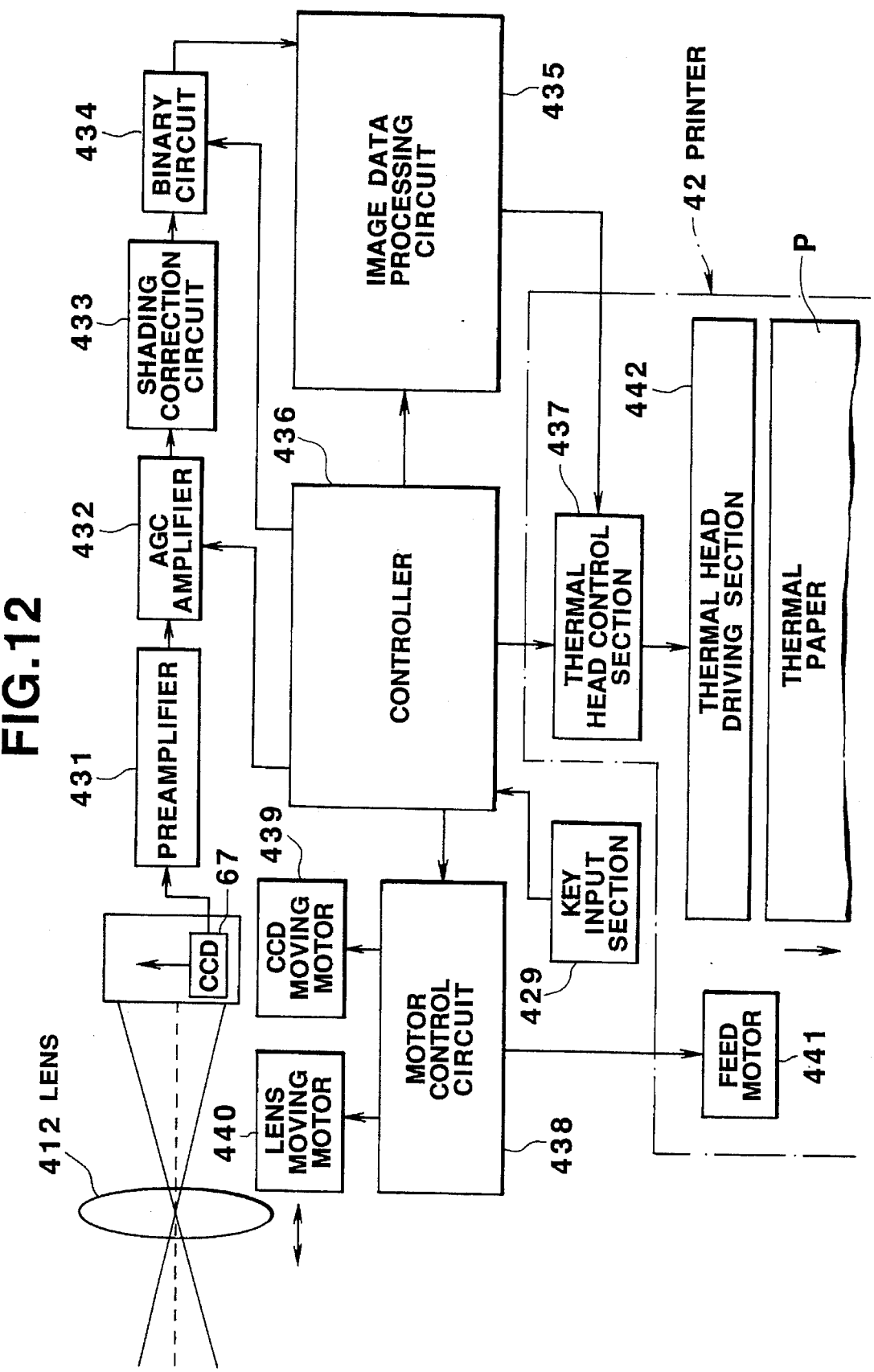
FIG. 12 is a block diagram showing the circuit arrangement of the embodiment.

FIG. 12 is a block diagram showing the internal structure of the electronic image pickup apparatus. The line sensor 67 constituted by the vertically arranged CCDs is arranged behind a lens 412 in the lens housing 14. The line sensor 67 is moved along the image formation plane of the lens 412 in the horizontal direction (an arrowhead direction) to read a one-frame image. More specifically, the line sensor 67 is designed to scan the image formation plane in the vertical direction by using, e.g, 1760 dot/line CCDs arranged in the vertical direction to obtain a one-line image signal, and sequentially output the image in units of vertical scanning lines upon horizontal movement.

The image signal output from the line sensor 67 is amplified by a preamplifier 431. The gain of the amplified signal is then adjusted to a constant value by an automatic gain control(AGC) amplifier 432 and is subjected to edge emphasis correction. The image signal output from the AGC amplifier 432 is processed by a shading correction circuit 433 such that the brightness/darkness of the central and peripheral portions of the image are corrected. The corrected signal is then gradation-controlled and binarized by a binary circuit 434. This binarized image signal is input to an image data processing circuit 435. Note that the binary circuit 434 and the image data processing circuit 435 will be described in detail later.

A controller 436 controls the overall system. The controller 436 receives operation information from each of the various keys shown in FIG. 1. The controller 436 controls a thermal head control section 437 and a motor control circuit 438, in addition to the AGC amplifier 432, the binary circuit 434, and the image data processing circuit 435, on the basis of the input operation information and the like. The motor control circuit 438 controls a CCD moving motor 439 for driving the line sensor 67 in the horizontal direction, a lens moving motor 440 for driving the lens 412 in the direction of the optical axis to focus it on the object, and a feed motor 441 for rotating the feed roller (not shown) of the printer 42.

The thermal head control section 437 controls a thermal head driving section 442 on the basis of a position control signal output from the controller 436 and synthesized data or the like output from the image data processing circuit 435 when the thermal head driving section 442 is operated in accordance with an input control signal and the like, a one-frame image, which is obtained when the line sensor 67 is horizontally moved along the image formation plane of the lens 412 once, is thermally transferred onto thermal paper P fed by the feed roller of the printer 42.

Figure 13:
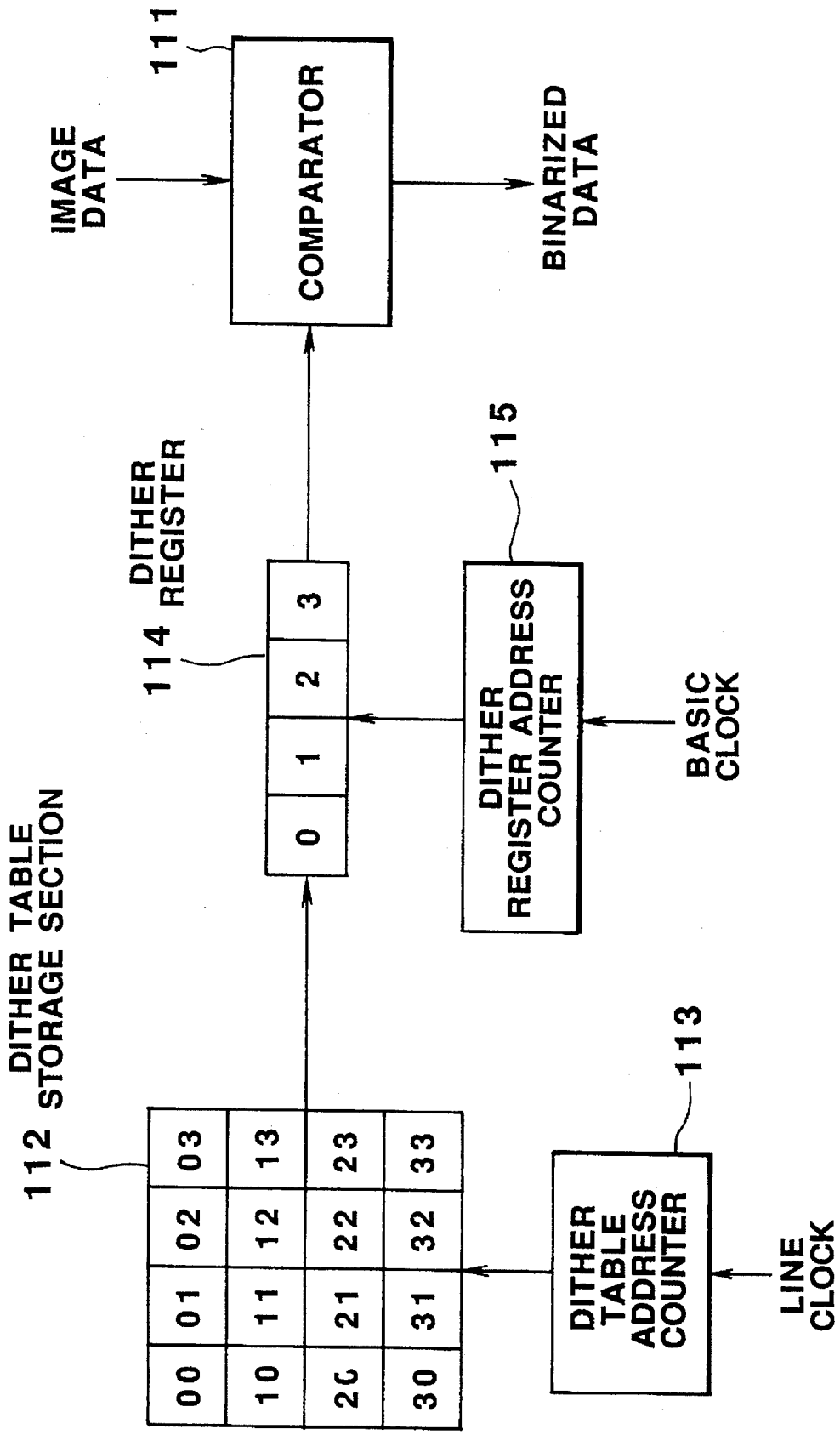
FIG. 13 is a block diagram showing the details of a binary circuit in FIG. 12.
Figures 14, 19:
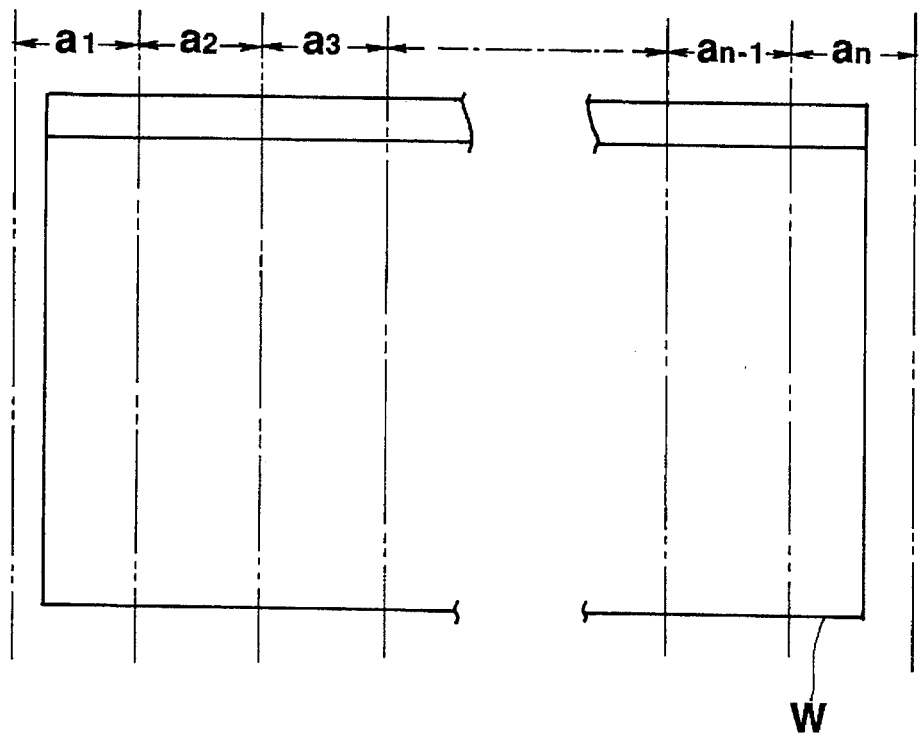
FIG. 14 is a view showing a dither pattern.
FIG. 19 is a view showing the data format of image data arranged in units of 10 lines.

FIG. 13 is a block diagram showing the details of the binary circuit 434. A comparator 111 compares image data transferred through the shading correction circuit 433 with a threshold to binarize the data. In addition, by changing this threshold using a dither table, a pseudo-half tone is realized. The dither table is stored, as a 4×4 table, in a dither table storage section 112. Although various patterns of such dither tables are known, for example, a pattern called "Bayer" shown in FIG. 14 is stored.

A column of the dither table storage section 112 is designated by a dither table address counter 113. A line clock synchronized with one line of image data from the controller 436 is supplied to the dither table address counter 113. The dither table address counter 113 updates the column to be designated in synchronism with one line clock. As a result, four threshold data of one column are transferred to a dither register 114.

The dither register 114 is constituted by four digits, i.e., register 0 to register 3, which are addressed by a dither register counter 115 so that four threshold data are sequentially read out and supplied to the comparator 111 in synchronism with each dot of image data. A basic clock synchronized with one dot of the image data from the controller 436 is supplied to the dither register counter 115. The dither register counter 115 sequentially updates the digit position, of the dither register 114, which is to be designated in synchronism with the basic clock. The comparator 111 compares each threshold supplied from the dither register 114 with image data, and outputs data binarized on the basis of the comparison result.

Figure 15:
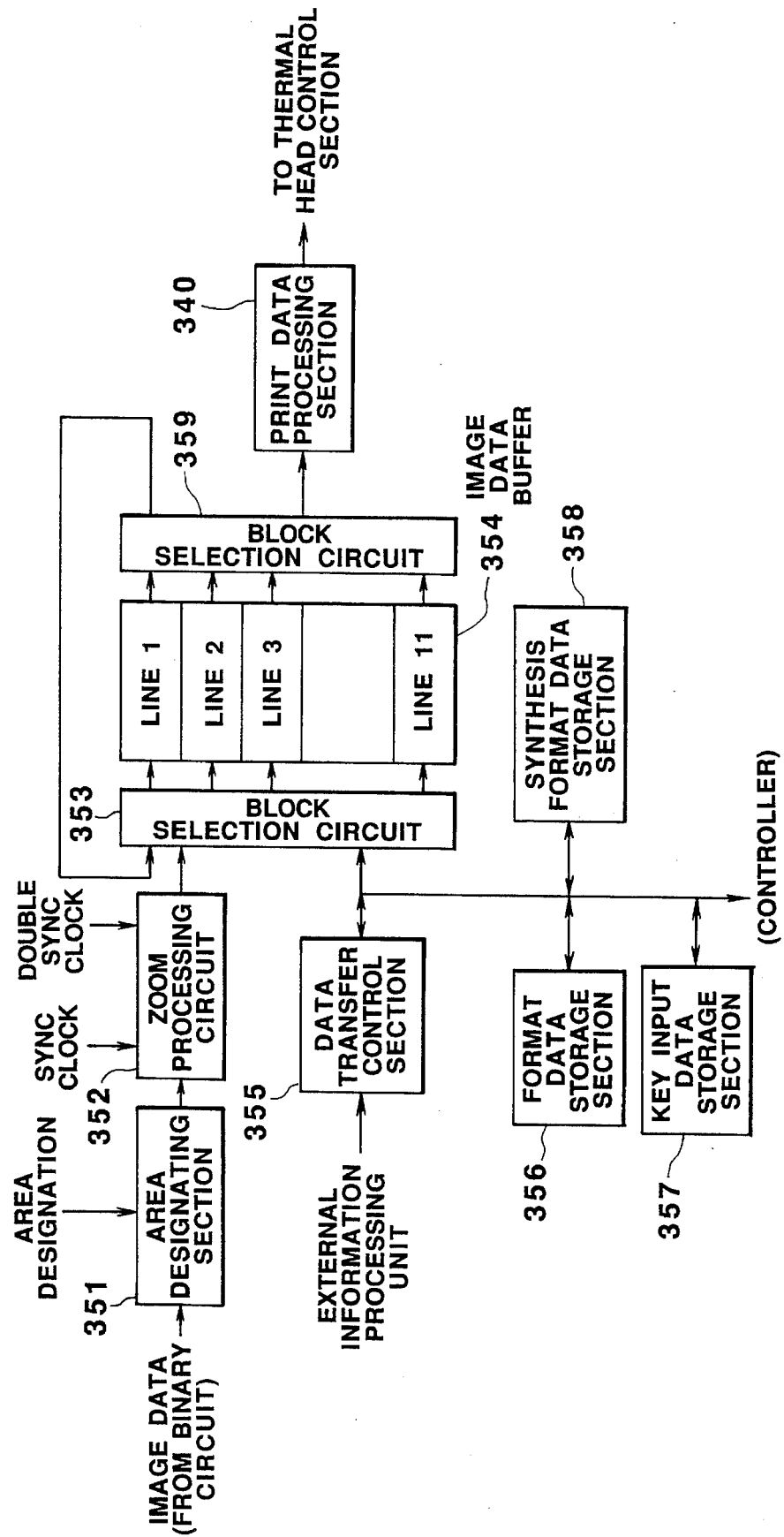
FIG. 15 is a block diagram showing the details of an image data processing circuit in FIG. 12.

FIG. 15 is a block diagram showing the details of the image data processing circuit 435. An area designation signal is supplied from the controller 436 to an area designating section 351 in response to an operation of the area adjustment key 33. More specifically, an image area can be designated by operating the area adjustment key 33 while seeing through the viewfinder 24. The area designating section 351 discriminates image data within a designated area from data outside the designated area, and transfers only the data within the designated area to a zoom processing circuit 352. The zoom processing circuit 352 receives a sync clock and a double sync clock having a period twice that of the sync clock from the controller 436.

Figure 16:
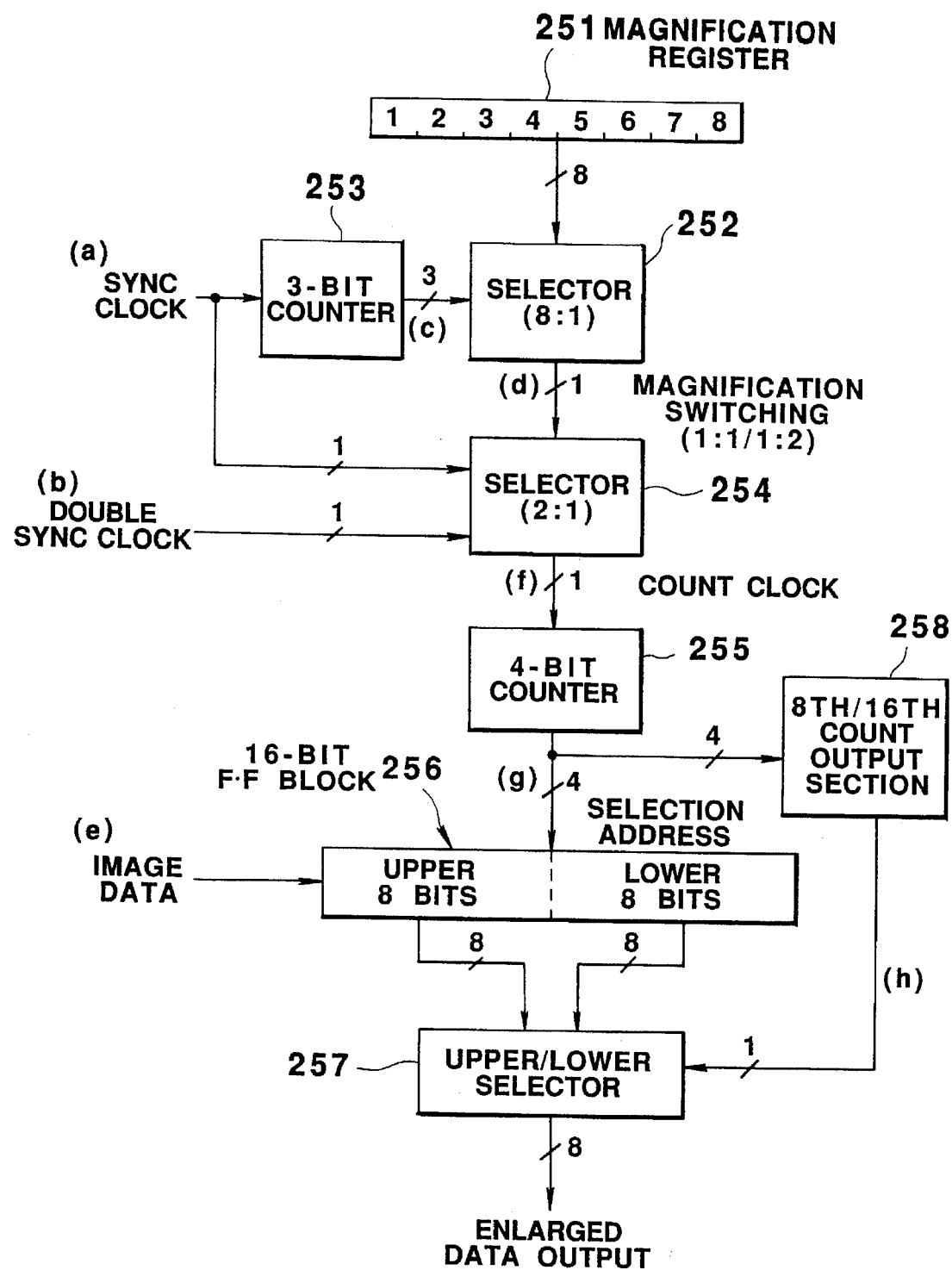
FIG. 16 is a block diagram showing the details of a zoom processing circuit in FIG. 15.

FIG. 16 is a block diagram showing the details of the zoom processing circuit 352. A magnification register 251 stores a magnification input from the controller 436 as 8-bit data, and inputs this 8-bit magnification data to a selector (8:1) 252. A sync clock (a) output from the controller 436 is input to a 3-bit counter 253 and a selector (2:1) 524. The 3-bit counter 253 sequentially outputs 3-bit counter values (c) including "0" to "7" to the selector (8:1) 252 in response to the sync clock (a). The selector (8:1) 252 sequentially supplies only a bit, of the 8-bit data input from the magnification register 251, which corresponds to the counter value (c) input from the 3-bit counter 253, to the selector (2:1) 254.

The sync clock (a) and a double sync clock (b) having a frequency twice that of the sync clock (a) (therefore, the period of the double sync clock is ½ that of the sync clock (a)) are input from the controller 436 to the selector (2:1) 254. The selector (2:1) 254 selects the sync clock (a) when a magnification register output (d) input from the selector (8:1) 252 is "0", and selects the double sync clock (b) when the output (d) is "1". The selector (2:1) 254 outputs the selected clock, as a count clock (f), to a 4-bit counter 255.

The 4-bit counter 255 outputs a selection address (g) consisting of 4-bit data to a 16-bit F.F (Flip-Flop) block 256 and an 8th/16th count output section 258 in synchronism with the input count clock (f). Image data $D_1$ is input to the 16-bit F.F block 256 through the area designating section 351 together with the selection address (g). The 16-bit F.F block 256 then latches a corresponding bits of the image data $D_1$ at the input timing of the selection address (g).

An upper/lower selector 257 switches the upper 8 bits and lower 8 bits of the 16-bit F.F block 256 in synchronism with an 8th/16th counter output (h) from the 8th/16th count output section 258. The upper/lower selector 257 alternately outputs enlarged 8-bit image data from the upper 8-bit side and the lower 8-bit side.

The output image data is then supplied/stored to/in line 1 of an image data buffer 354 through a block selection circuit 353 in FIG. 15o The block selection circuit 353 in FIG. 15 is connected to the controller 436 through data and address buses, and is also connected to a data transfer control section 355, a format data storage section 356, a key input data storage section 357, and a synthesis format data storage section 358. The format data storage section 356 is constituted by a ROM and is designed to store a plurality of types of formats, each comprising fixed form data such as frame data corresponding to image data obtained from an object and title display data set on a portion of the frame data.

Figure 17A:
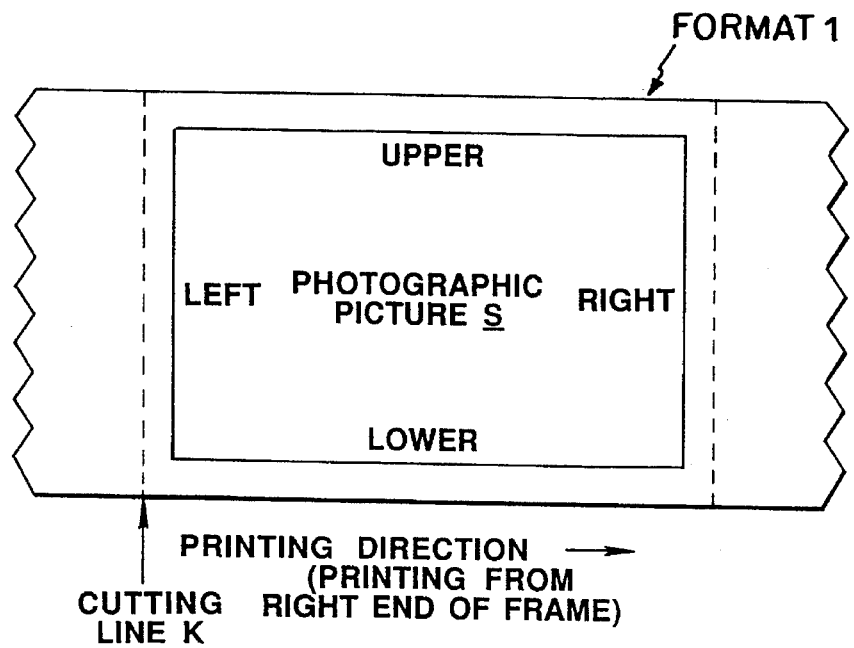
FIG. 17A and 17B are views showing images printed on the basis of image data.
Figure 17B:
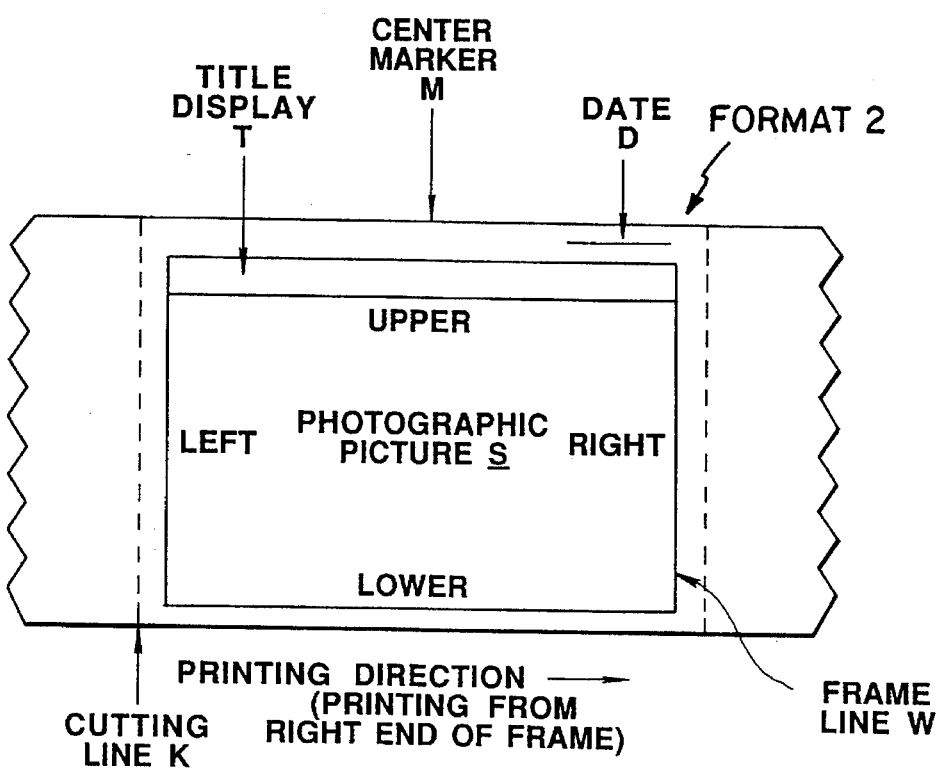
Figure 18:
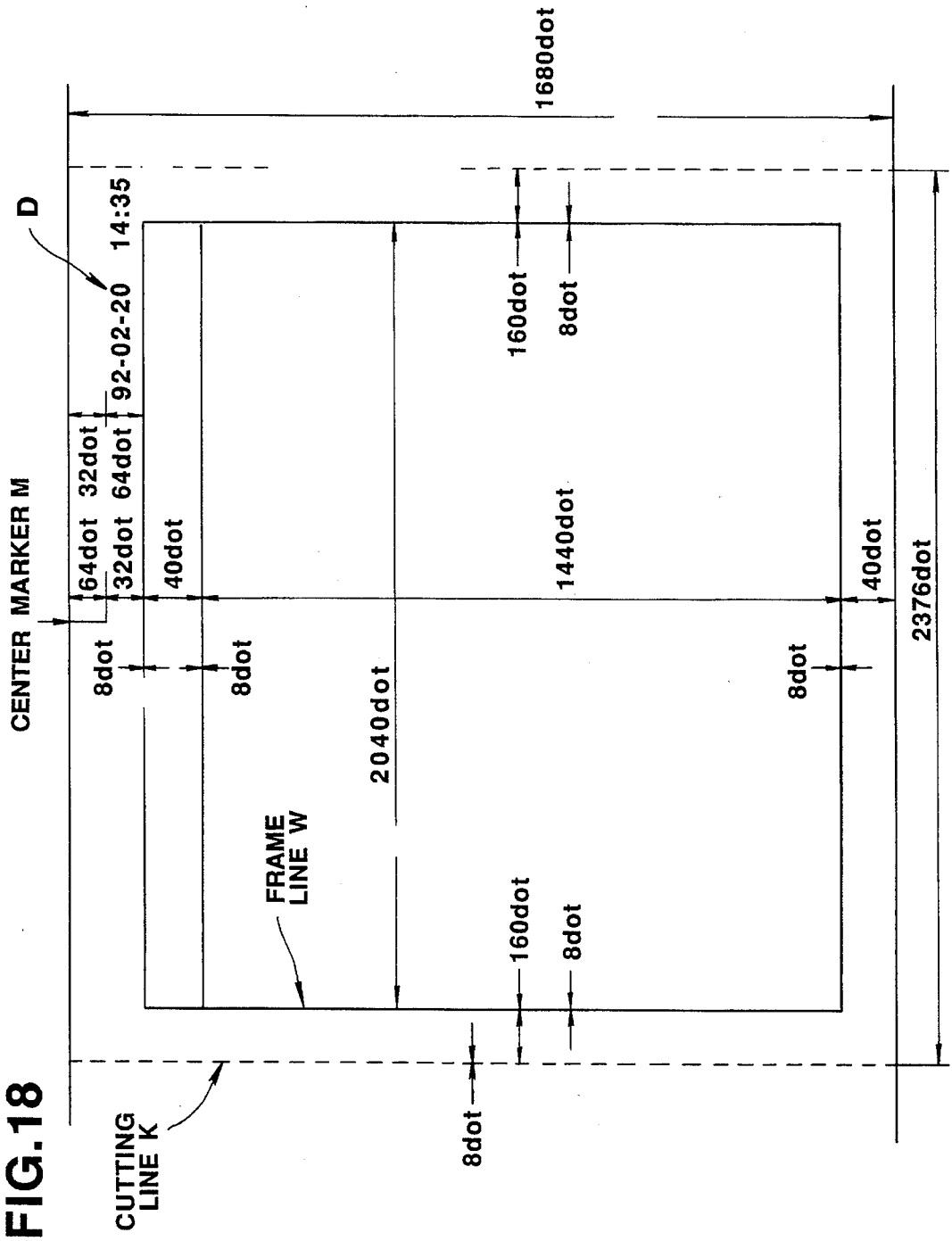
FIG. 18 is a view showing the number of dots of each image printed on the basis of image data.

FIGS. 17A and 17B show formats stored in the format data storage section 356. FORMAT 1 in FIG. 17A is a format with no frame data synthesized, which is constituted by only data allowing cutting lines K to be printed on both sides of a photographic frame S formed by the image data. FORMAT 2 in FIG. 17B is a format with frame data synthesized, which is constituted by data allowing frame lines W, a title display portion T, a center marker M, and a date D to be printed in addition to the cutting lines K. In FORMAT 2 in FIG. 17B, the frame lines W, the cutting lines K, and the like are respectively constituted by the numbers of dots shown in FIG. 18. For example, the length of each cutting line K corresponds to 1680 dots (equal to the total length of a short side of A4-size thermal paper); the width of each cutting line K, 8 dots; and the distance between the cutting lines K, 2,376 dots. In addition, the frame lines W, the title display portion T, the center marker M, and the date D are constituted by the number of dots shown in FIG. 18.

The key input data storage section 357 is constituted by a RAM and is designed to store key input data such as title and document name data transferred from the jack 19 through the data transfer control section 355. The synthesis format data storage section 358 is constituted by a RAM, in which format data selected and read out from the format data storage section 356 in accordance with an operation of the START/STOP key 36, and key input data read out from the key input data storage section 357 are synthesized and stored when the synthesis mode is set. The image data buffer 354 is constituted by 11 line buffers, i.e., line 1 to line 11 (1,760 bits=220 bytes). A block selection circuit 359 is arranged on the output stage of each line buffer.

In this case, line 1 of the image data buffer 354 serves as a synthesizing buffer. When image data is supplied from the zoom processing circuit 352, the block selection circuit 353 selects line 1, and one-line image data is stored in line 1. In addition, 10-line synthesis image read out from the synthesis format data storage section 358 are stored in line 2 to line 11, sequentially selected by the block selection circuit 353, in units of lines.

when one-line image data is stored in line 1, the block selection circuit 359 arranged on the output stage of each line buffer selects line 2 first, and transfers the synthesis image data, stored in line 2, to the block selection circuit 353 on the input stage of each line buffer. The block selection circuit 353 then selects line 1 to store the synthesis image data therein. The one-line image data and the synthesis image data stored in line 1 are synthesized in units of bytes. The synthesized data obtained by synthesizing the image data and the synthesis image data is supplied to a print data processing section 340 through the block selection circuit 359.

The print data processing section 340 converts the synthesized data, transferred in units of bytes, into one-line serial data consisting of 220 bytes, and transfers it to the thermal head control section 437. The thermal head control section 437 controls the thermal head driving section 442 on the basis of a printer head control signal input from the controller 436, the synthesized data, and the like. When the thermal head driving section 442 operates in accordance with the input signals and the like, a one-line image is printed on the thermal paper P, fed by the feed roller of the printer 42, on the basis of the one-line data synthesized in line 1.

When the next one-line image data is stored in line 1 of the image data buffer 354, the block selection circuit 359 on the output stage of each line buffer selects line 3. As a result, the synthesis image data stored in line 3 is transferred to line 1 and is synthesized with the image data therein in the above-described manner. Thereafter, the synthesized data is output from the print data processing section 340. Subsequently, one-line image data sequentially stored in line 1 is synthesized with the synthesis image data in line 4, line 5, . . . , line 11, and the synthesized image data are printed in units of lines. When synthesis of the synthesis image data stored in line 2 to line 11 is completed, the next 10-line synthesis image data are read out from the synthesis format data storage section 358 and are respectively stored in line 2 to line 11 selected by the block selection circuit 353. Thereafter, synthesis processing is performed in units of lines in the same manner as described above.

If the synthesis image data stored in line 2 to line 11 are identical to the next 10-line synthesis image data, the previously used synthesis image data stored in line 2 to line 11 are used again without reading out the next 10-line synthesis image data from the synthesis format data storage section 358. More specifically, assume that the synthesis image data for the frame W illustrated in FIG. 19 is stored in the synthesis format data storage section 358, and each data a is a 10-line data group. In this case, 10-line data $a_1$ and $a_n$ are different from other 10-line data $a_2$ to $a_{n-1}$, but the ten-line data $a_2$ to $a_{n-1}$ are the same data for printing three horizontal ruled lines.

In this case, therefore, when the 10-line synthesis image data $a_2$ is stored in line 2 to line 11, and synthesis with image data in units of lines is completed, synthesis processing is performed by using the data $a_2$ stored in line 2 to line 11 again in the same manner as described above without reading out the next 10-line synthesis image data $a_3$ from the synthesis format data storage section 358. When synthesis processing is continuously performed (n–2) times by using the 10-line synthesis image data $a_2$, synthesis of format data for printing three horizontal ruled lines corresponding to the data $a_2$ to $a_{n-1}$ and the image data is completed. Therefore, by reading out the data $a_1$, $a_2$, and $a_n$ and storing them in line 2 to line 11, the entire synthesis image data shown in FIG. 19 can be synthesized with the image data without reading the synthesis image data a n times.

An operation of the embodiment having the above arrangement will be described in detail below. When an object image on a blackboard or the like is to be picked up, the object image to be picked up is checked through the viewfinder 24, and the=area adjustment key 33 is operated, as needed, thereby designating an area of the object image to be picked up. Subsequently, when the START/STOP key 36 is operated, the focus screen 49 and the LCD 50 located at the image formation plane are moved to the retraction position together with the mirror 55, as shown in FIG. 10, and the mirror 55 shields external disturbing light from the viewfinder 24 side. The image scanner 46 is horizontally moved along the image formation plane. In this case, on the forward movement, the distance to the object is detected by the infrared distance sensor 45, and the lens 412 is moved to a lens position corresponding to the detected distance to complete an AF operation. In addition, as the image scanner 46 moves, an automatic exposure (AE) operation is executed on the basis of an output from the line sensor 67.

On the backward movement, in order to pick up an image of the object, the line sensor 67 is activated to output image data of one vertical line at the left end of the image formation plane of the lens 412. This one-line image data is input to the binary circuit 434 through the preamplifier 431, the AGC amplifier 432, and the shading correction circuit 433.

Figure 20:
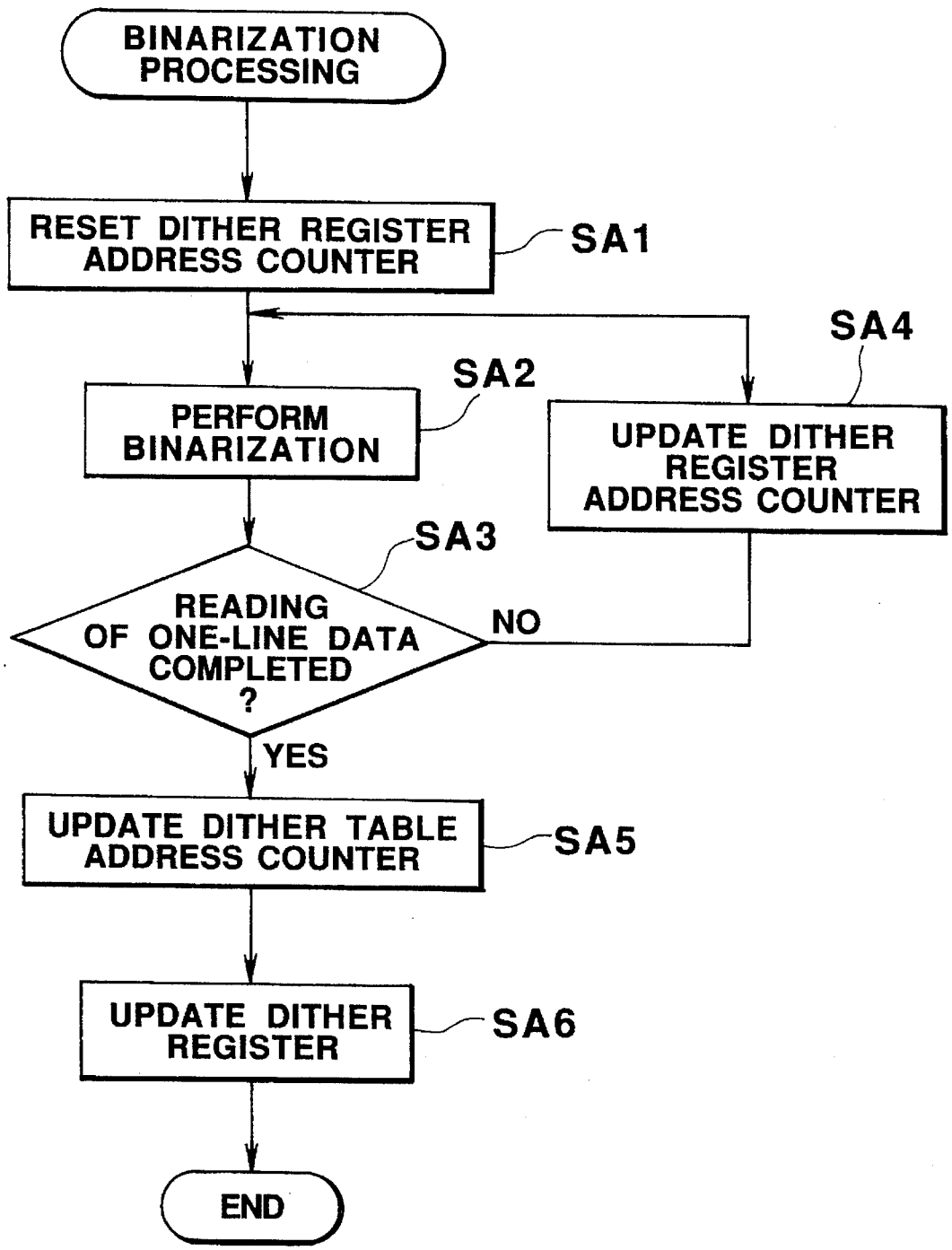
FIG. 20 is a flow chart showing a procedure for binarization processing executed by the binary circuit.
Figure 21:
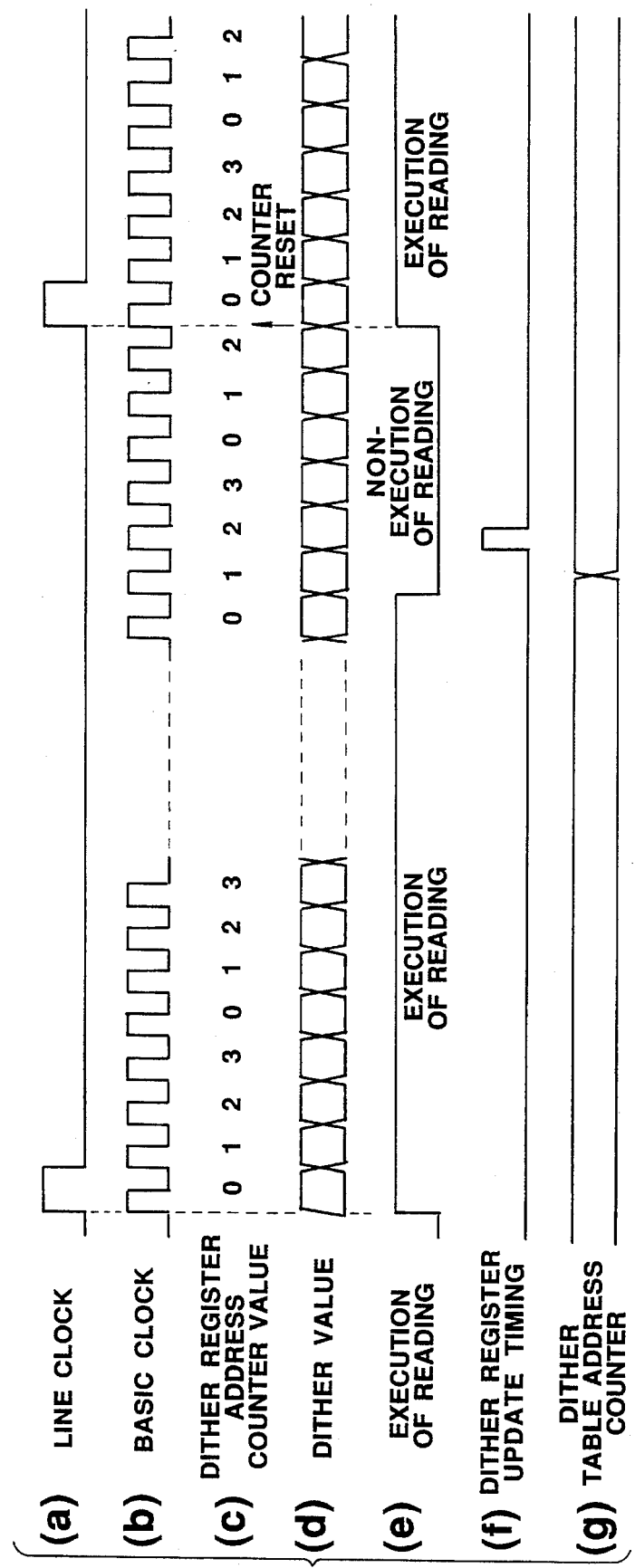
FIG. 21 is a timing chart for explaining an operation of the binary circuit.

The binary circuit 434 operates in accordance with the flow chart shown in FIG. 20 and the timing chart shown in FIG. 21. When a line clock is output from the controller 436, the dither register address counter 115 is reset in step SA1. With this operation, the count value of the dither register address counter 115 becomes "0", and the threshold stored in register 0 of the dither register 114 in advance is designated at the timing of the basic clock, as shown in FIG. 21. The comparator 111 then compares the threshold stored in register 0 and corresponding to the count value of the dither register address counter 115 with one-dot image data input from the shading correction circuit 433 in synchronism with the basic clock. If the image data is larger than the threshold, the data is converted into a black digital image signal. If the data is less than the threshold, the data is converted into a white digital image signal. With this operation, each image data is binarized in step SA2.

Subsequently, the controller 436 checks in step SA3 whether reading of one-line data is completed. If NO in step SA3, the basic clocks are kept output and the dither register address counter 115 updates the count value at the timing of the next basic clock in step SA4. The comparator 111 compares one of the thresholds in register 0 to register 3 which is designated by the updated count value of the dither register address counter 115 with one-dot image data input at the timing of the same basic clock, and outputs binarized data, in the same manner as described above. That is, the loop of steps SA2 to SA4 is repeated until reading of one-line data is completed. With this operation, as shown in FIG. 21, the dither register address count value is changed at the timing of each basic clock in the following order: 0→1→2→3→0→ . . . . The image data are sequentially binarized by using the dither values stored in register 0 to register 3 which are designated by this dither register address counter value, and the binarized data are sequentially output.

When reading of one-line data is completed, and binarization of the one-line data is also completed, the count value of the dither table address counter 113 is updated in step SA5. At this time, the count value of the dither table address counter 113 indicates a column next to the column previously indicated in the dither table storage section 112. Subsequently, four data in the column indicated by the dither table address counter 113 are read out, and the four data are respectively written in register 0 to register 3 of the dither register 114, thus updating the dither register 114 in step SA6. Therefore, when the flow in FIG. 20 comes to "END", the four thresholds to be used for binarization of the next line data are respectively stored in register 0 to register 3 of the dither register 114.

When the next line clock is output from the controller 436, and an operation is executed in accordance with the flow chart in FIG. 20 in the same manner as described above, binarization of one-line data is executed by using the four thresholds stored in the column next to the previous column in the dither table storage section 112. More specifically, in binarization processing, the thresholds in the 4 (row)×4 (column) table stored in the dither table storage section 112 are stored in the dither register 114 in units of columns for each one-line image data, and each one-line image data is binarized by using the thresholds in each column. The sequentially binarized one-line image data are input to the image data processing circuit 435.

Figure 22:
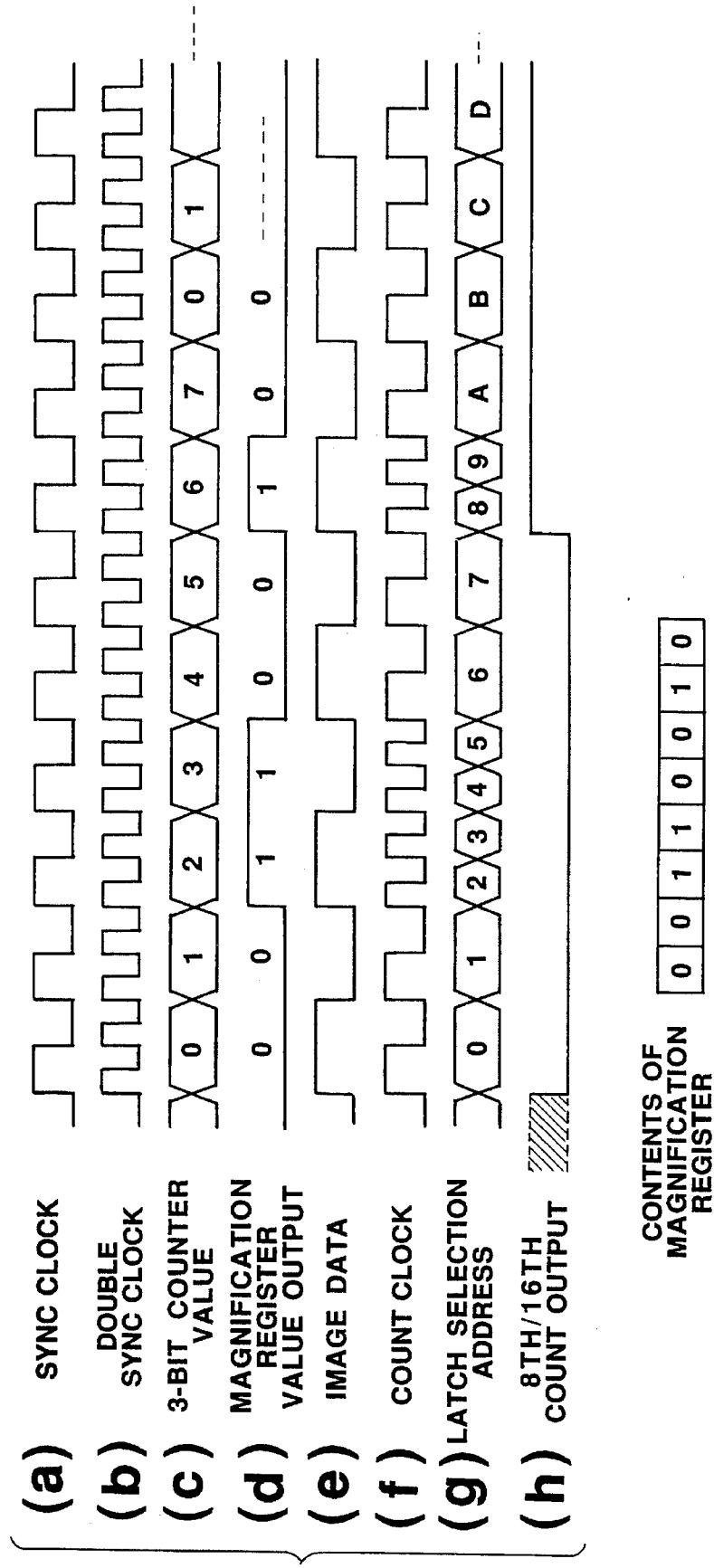
FIG. 22 is a timing chart showing states at points (a) to (f) in FIG. 16.

In the image data processing circuit 435, the area designating section 351 cuts image data located outside a designated area in accordance with an area designation signal supplied from the controller 436 upon operation of the area adjustment key 33 at the start of the image pickup operation described above, and supplies only image data within the area to the zoom processing circuit 352. The zoom processing circuit 352 then operates in accordance with the timing chart in FIG. 22 which indicates states at points (a) to (h) in FIG. 16. More specifically, a sync clock (a) having a predetermined period is input to the 3-bit counter 253 and the selector (2:1) 254, and the 3-bit counter 253 outputs 3-bit counter values (c) including "0" to "7" in synchronism with the leading edge of the sync clock (a). The selector (8:1) 252 then outputs magnification register value outputs (d) in synchronism with the 3-bit counter values (c) from the 3-bit counter 253. If the contents of the magnification register 251 are "00110010", as indicated by a lower portion in FIG. 22, magnification register value outputs (d) "00110010" are sequentially output in correspondence with "01234567" of the 3-bit counter values (c).

A count clock (f) from the selector (2:1) 254 serves as a sync clock (a) if a magnification register value output (d) is "0", and serves as a double sync clock (b) if the magnification register value output (d) is "1". If, however, magnification register value outputs (d) are "00110010" as in this embodiment, since a magnification data output value (d) is "1" when a 3-bit counter value (c) is 2, 3, and 6, two count clocks (f) are output, and 11 clocks are output until the 3-bit count value (c) becomes "7".

Meanwhile, the 4-bit counter 255 outputs 0th to 16th latch selection addresses (g) in synchronism with the count clocks (f). The 16-bit F.F block 256 latches image data (e) at the timing of each latch selection address (g). As a result, the image data (e) is latched once by the time the 3-bit counter value is changed from "0" to "7".

Figure 23:
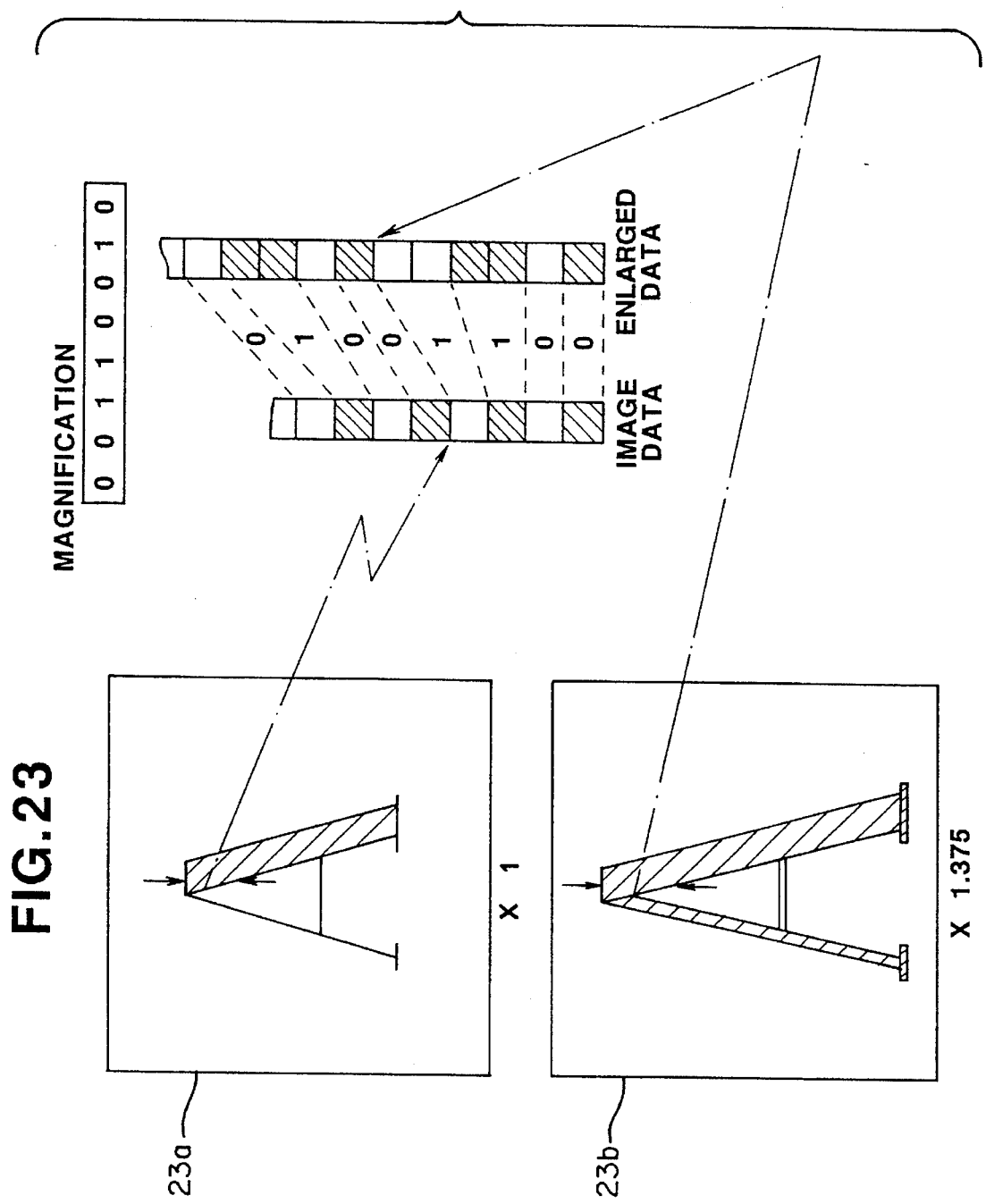
FIG. 23 is a view for explaining the contents of image data enlargement processing.
Figure 24:
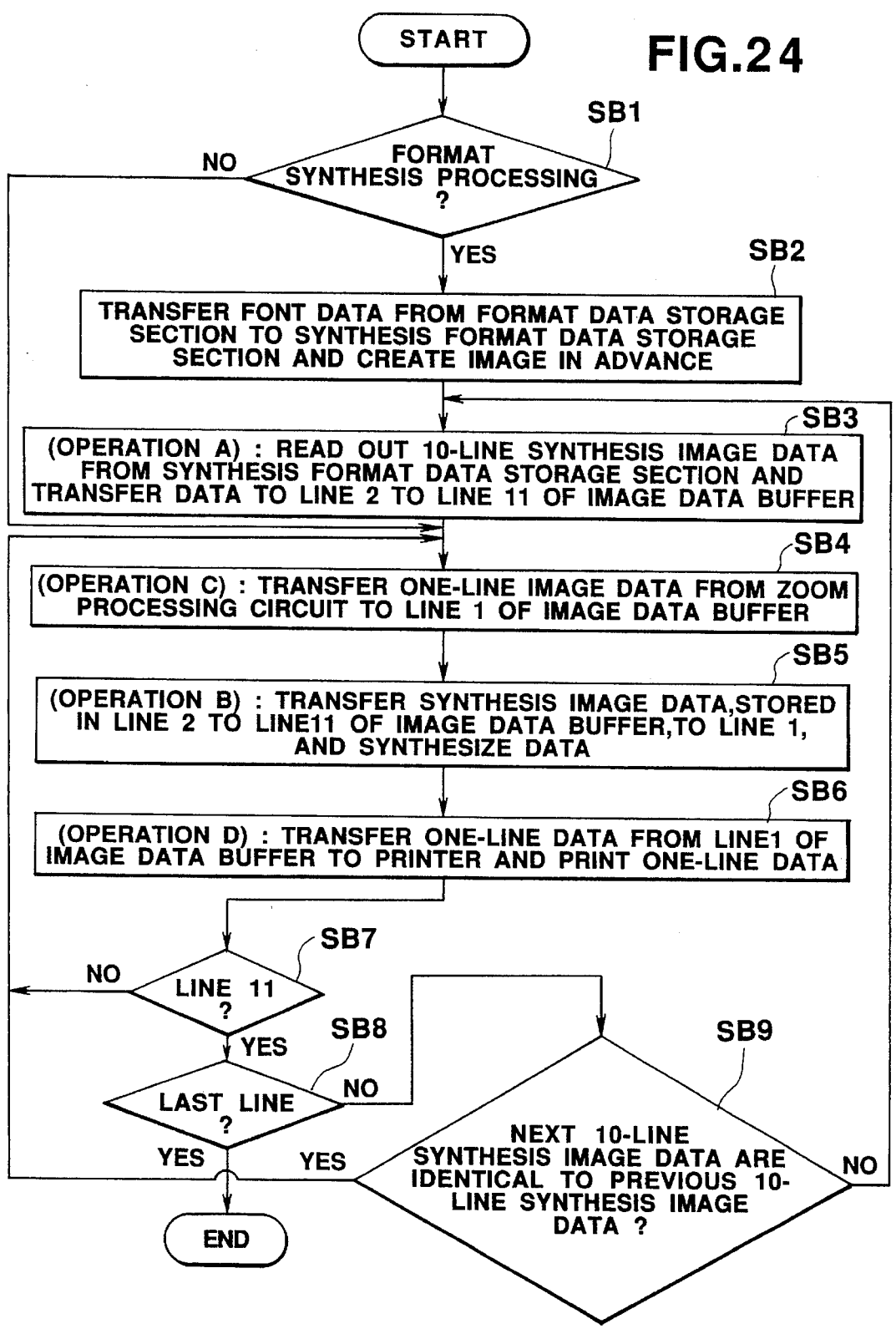
FIG. 24 is a flow chart showing a sequence of operations of an image data processing circuit.

More specifically, as indicated by "(1)" in FIG. 23, assuming that eight image data corresponding to an arbitrary portion of an image A are serially input, and magnification data "00110010" is stored in the magnification register 251, each image data corresponding to "1" of the magnification data is latched two times at the timing of a double sync clock, and hence the 8-bit image data is output as enlarged data consisting of 11 bits. Therefore, if such enlarged data which are output in units of 11 bits with respect to 8-bit image data are transferred in units of 8 bits upon operation of the upper/lower selector 257, one-line image data allowing thermal transfer of an image enlarged to a size 11/8 that of the original image, i.e., an image vertically enlarged at X1.375 magnification, is stored in line 1 of the image data buffer 354 through the block selection circuit 353. If, therefore, the printer 42 is operated by using the one-line image data sequentially stored in line 1, an image vertically enlarged at X1.375 magnification can be printed, as indicated by "(2)" in FIG. 23. Note that lateral enlargement of an image to be printed can be realized by consecutively performing a printing operation a plurality of number of times using the one-line image data stored in line 1.

when the date/frame key 29 is operated to set a synthesis mode prior to an ON operation of the START/STOP key 36, format data stored in the format data storage section 356 in FIG. 15 is read out. When title data or the like to be synthesized with the format data is input, as key input data, from an external information processing unit such as a personal computer through the jack 19, the key input data is transferred through the data transfer control section 355 and is stored in a predetermined storage area in the key input data storage section 357.

Figure 25:
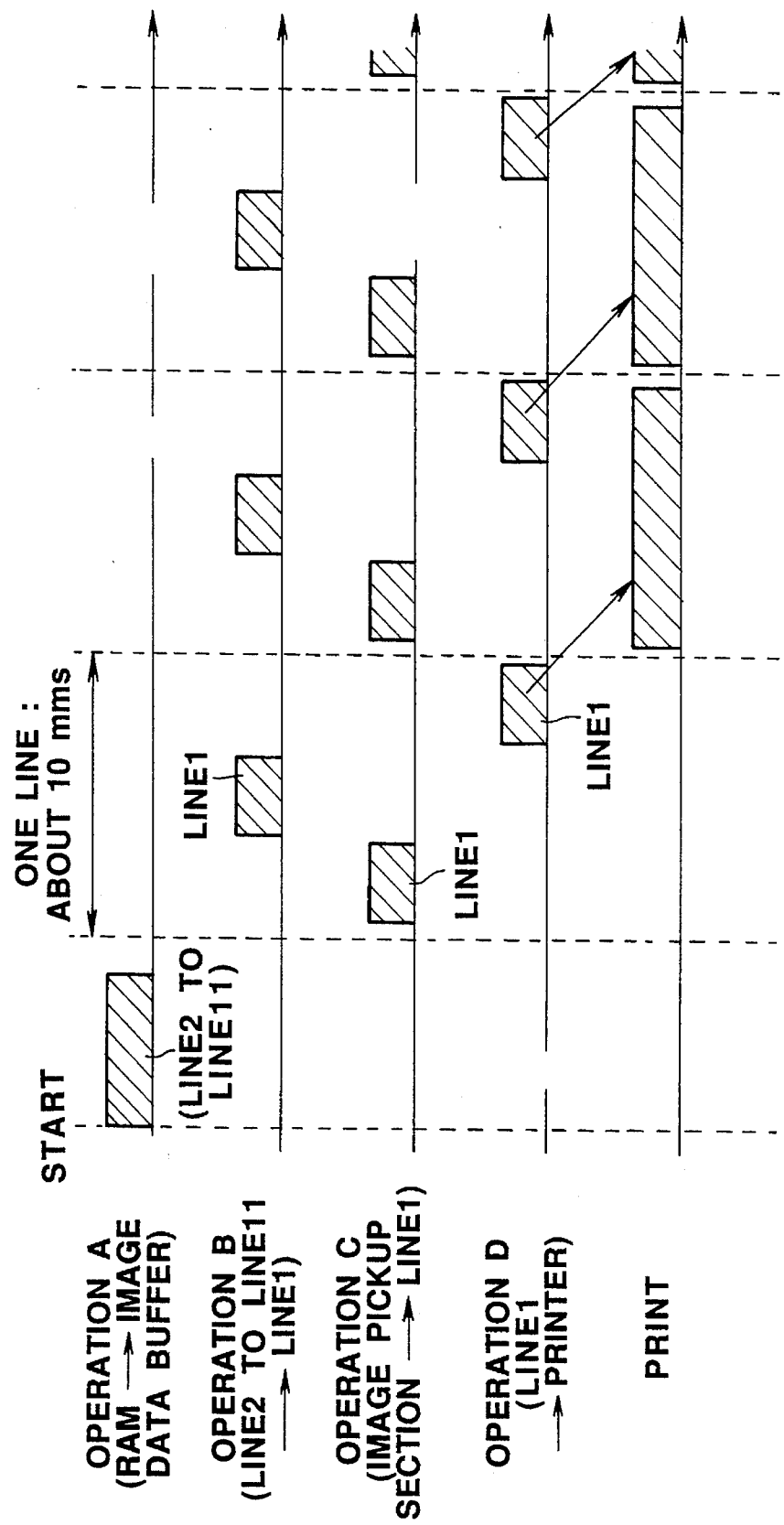
FIG. 25 is a timing chart for explaining an operation of the image data processing circuit.
Figure 26:
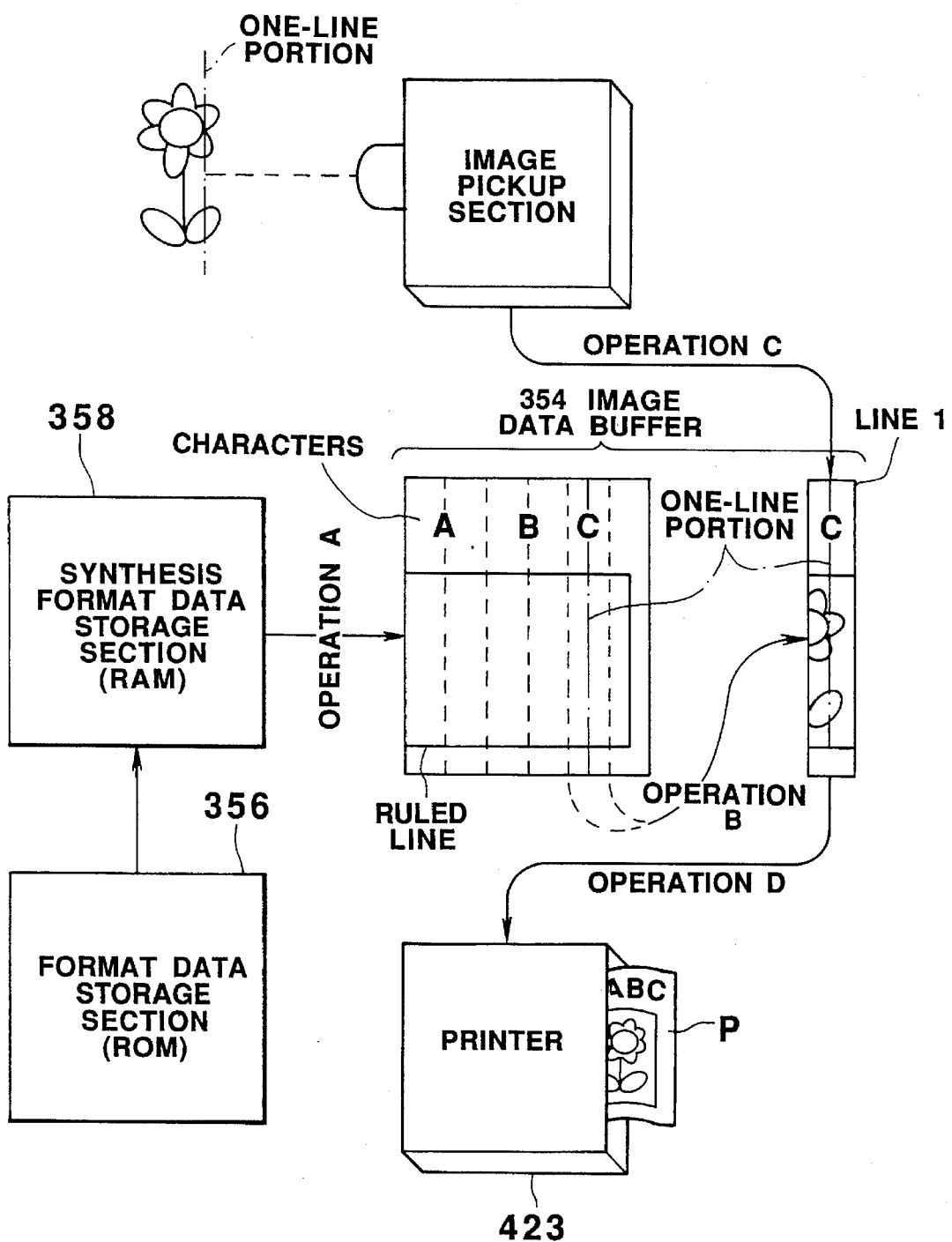
FIG. 26 is a schematic diagram showing a procedure for creating synthesized data in the image data processing circuit.

On the other hand, the controller 436 starts an operation in accordance with the flow chart shown in FIG. 25 in response to an operation of the START/STOP key 36, and determines in step SB1, on the basis of the currently set operation mode, whether to perform format synthesis processing. If the current operation mode is the synthesis mode, the controller 436 transfers font data from the format data storage section 356 to the synthesis format data storage section 358, and constructs an image in advance in step SB2, in order to perform format synthesis processing. In addition, the controller 436 performs an operation A shown in FIGS. 26 and 27 to read out 10-line synthesis image data from the synthesis format data storage section 358 and transfer the data to line 2 to line 11 of the image data buffer 354 in step SB3.

Subsequently, an operation C is executed to transfer one-line image data from the zoom processing circuit 352 to line 1 of the image data buffer 354 in step SB4. An operation B is then executed to transfer one-line synthesis image data from a predetermined line of line 2 to line 11 of the image data buffer 354 to line 1 and perform synthesis processing in step SB5. Furthermore, an operation D is executed to transfer one-line data (synthesized data) from line 1 of the image data buffer 354 to the printer 42 and print it in step SB6. It is then checked in step SB7 whether the above processing is executed up to line 11 of the image data buffer 354. The loop of steps SB4 to SB7 is repeated until processing for line 11 is completed.

The loop of steps SB4 to SB7 is repeated 10 times by the time the processing for line 11 is completed. With this operation, a printing operation based on 10-line synthesized data is completed. At this time, as indicated by the timing chart in FIG. 25, while the printer 42 is printing an image corresponding to one line, the above-described operations C, B, and D are sequentially executed. Therefore, by the time the printer 42 completes a printing operation corresponding to one line, creation of the next one-line synthesized data will have been completed. This allows smooth and continuous printing of each line.

When the printing operation based on the 10-line synthesized data is completed in this manner, it is checked in step SB8 whether the above processing is executed up to the last line of the entire synthesis image data. If NO in step SB8, it is further checked in step SB9 whether the next 10-line synthesis image data are identical to the previous 10-line synthesis image data. If YES in step SB9, the loop of steps SB4 to SB7 is repeated. With this operation, 10-line synthesized data are generated by using the same synthesis image data as those previously stored in line 2 to line 11, and a printing operation based on the synthesized data is completed. If NO in step SB9, the processing in step SB3 and the subsequent steps is executed to synthesize newly read 10-line synthesis image data with image data and execute a printing operation on the basis of the resultant synthesized data. When the data of the last line of the entire synthesis image data is transferred to line 2 to line 11, and YES is obtained in step SB8, printing of a one-frame image is completed.

Although this embodiment uses the image data buffer 354 having line buffers corresponding to line 1 to line 11, an image data buffer having only a single line buffer may be used. In this case, synthesis image data may be directly read out from a RAM (synthesis format data storage section 358) in units of lines, and image data and the synthesis image data may be synthesized in a single image data buffer.

As described above, according to the first embodiment of the present invention, image data are generated in units of lines, data to be synthesized with the image data are generated in units of lines, and both the data are synthesized in the line buffer to create synthesized data. When a printing operation is to be performed on the basis of the synthesized data, since one-line synthesized data is created in advance, a synthesized image can be printed by sequentially transferring the synthesized data to the printer unit without requiring precise timing control.

The second embodiment of the present invention will be described below with reference to the accompanying drawings.

Figure 27:
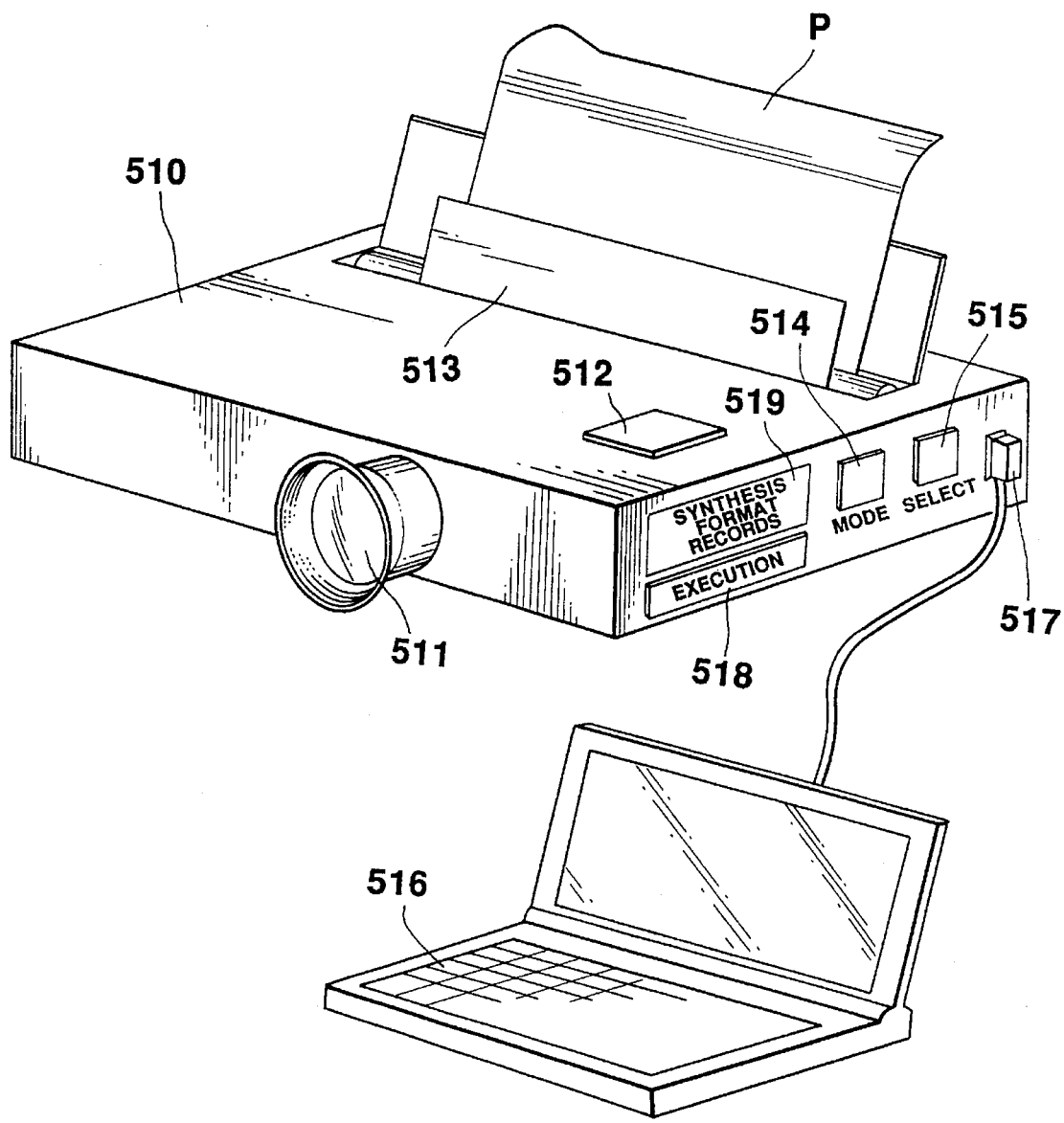
FIG. 27 is a perspective view showing the outer appearance of an electronic image pickup apparatus according to the second embodiment of the present invention.

FIG. 27 shows the outer appearance of an electronic image pickup apparatus according to the second embodiment. A main body case 510 of this electronic image pickup apparatus measures 300 mm (width)×250 mm (depth)×55 mm (height). An image pickup lens 511 is arranged on the front surface of the case 510, and a shutter 512 and a printing portion 513 are arranged on the upper surface of the case 510.

In the electronic image pickup apparatus, upon operation of the shutter 512, an object image formed on a built-in CCD (solid-state image pickup element:about 7,200×9,600 dots) through the image pickup lens 511 is printed out, as image data, on A4-size recording paper P in a printing portion 513.

The following keys and portions are arranged on a side surface of the main body case 510: a mode key 514 for switching between a normal mode and a synthesis mode for synthesizing preset format data with print image data to be printed in the printing portion 513; a select key 515 for selecting preset format data such as a minutes format or a storage format; an external input terminal 517 for receiving key input data from an external information processing unit 516 when character data such as title or document name data is synthesized at a predetermined position (an item entry space or the like) of the format data selected by the select key 515; an execution key 518 which is operated to synthesize the format data selected by the select key 515 with the key input data from the external input terminal 517; and a display portion 519 for displaying an operating state such as the mode switching or format selecting operation described above.

The above format data is constituted by frame data for forming a frame around the print image data and fixed form data for forming, e.g., an item entry space on a portion of the frame. A plurality of types of such format data are stored in the apparatus main body in advance. Assume that character information on a blackboard at a meeting or the like is an object image. In this case, the mode key 514 and the select key 515 are operated to select the minutes format, and title and date data are supplied, as key input data, through the external input terminal 517 to be synthesized with the minutes format in advance. When the execution key 518 is operated, the minutes format in which the title, the date, and the like are written is synthesized with image data printed by the printing portion 513 in accordance with an operation of the shutter 512, and the synthesized data is output.

Figure 28:
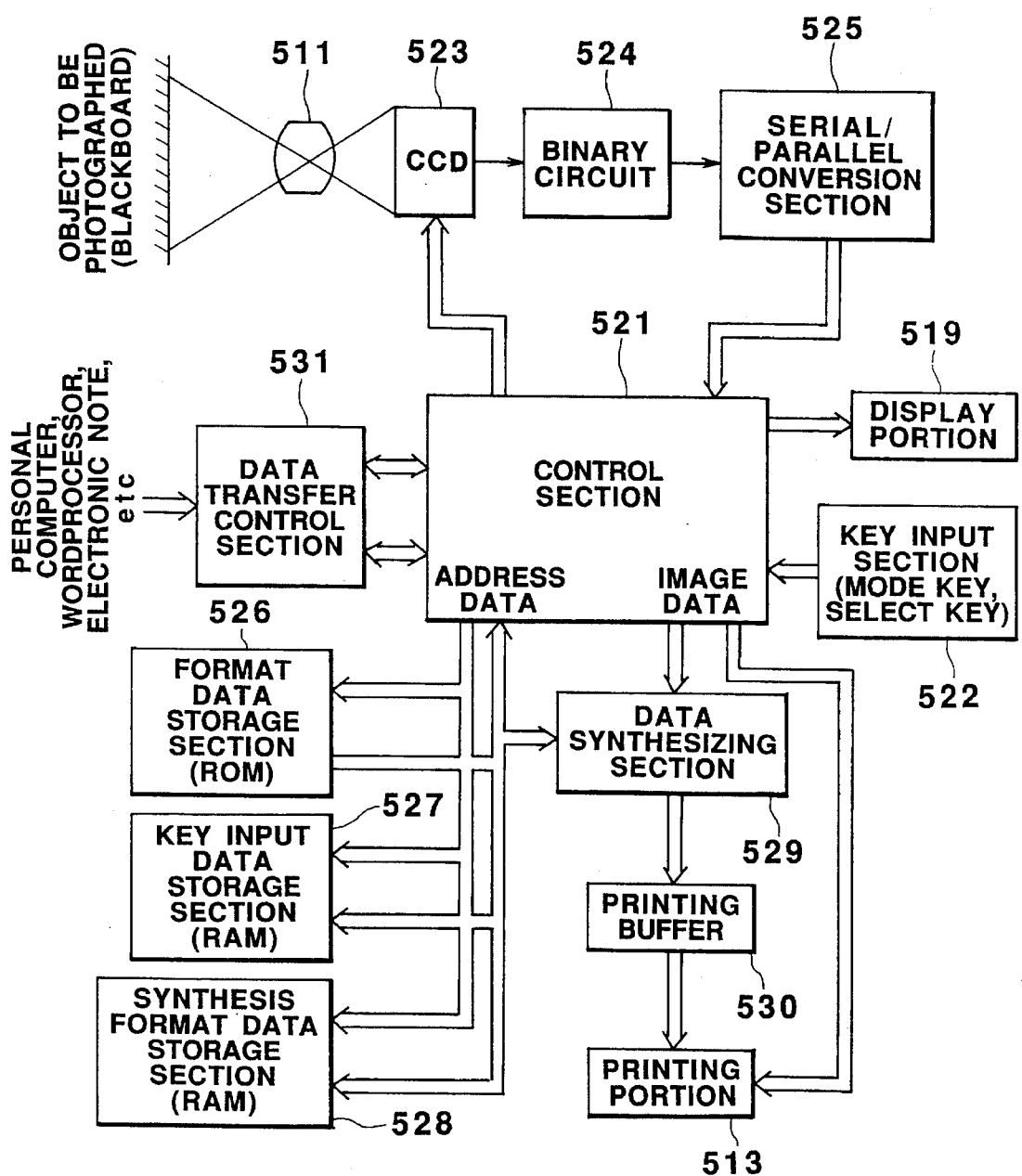
FIG. 28 is a block diagram showing the circuit arrangement of the embodiment.

FIG. 28 shows the arrangement of an electronic circuit in the electronic image pickup apparatus. This electronic circuit incorporates a control section 521 for controlling an operation of each component of the circuit. The control section 521 receives a key operation signal from a key input section 522 constituted by the shutter 512, the mode key 514, the select key 515, and the execution key 518.

when the shutter 512 is operated, a CCD driving signal is output from the control section 521 to drive a CCD 523.

The CCD (Charge Coupled Device) 523 is constituted by a group of a large number of solid-state image pickup elements (about 7,200×9,600 dots) and is designed to convert an optical object image, formed through the image pickup lens 511, into an electrical signal. The image signal output from the CCD 523 is supplied to a binary circuit 524.

The binary circuit 524 serves to convert the analog image signal corresponding to the object image, which signal is output from the CCD 523, into a digital image signal consisting of binary values representing black and white image portions. The digital image data obtained by the binary circuit 524 is converted into parallel data in units of, e.g., 8 bits, and is supplied to the control section 521 through a serial/parallel conversion section 525.

The following components are connected in parallel with the control section 521 through data and address buses: a format data storage section 526, a key input data storage section 527, a synthesis format data storage section 528, and a data synthesizing section 529. In addition, the data synthesizing section 529, a printing butter 530, and the printing portion 513 are connected in series with the control section 521 through an image data bus.

The external input terminal 517 is connected to the control section 521 through a data transfer control section 531.

The format data storage section 526 is constituted by a read-only memory (ROM) and is designed to store a plurality of types of minutes formats, each constituted by fixed form data such as frame data corresponding to image data obtained from an object and data for an item entry space set on a portion of the frame, and a plurality of types of storage formats.

The key input data storage section 527 is constituted by a random access memory (RAM) and is designed to store key input data such as title and document name data input/transferred from the external input terminal 517 through the data transfer control section 531.

The synthesis format data storage section 528 is constituted by a RAM. In the synthesis format data storage section 528, format data, selected and read out from the format data storage section 526 in accordance with an operation of the execution key 518 upon setting of the synthesis mode, and the key input data read out from the key input data storage section 527 are synthesized and stored.

In this case, the format data storage areas in the format data storage section 526, the storage areas in the key input data storage section 527, and the synthesis storage areas in the synthesis format data storage section 528 are arranged in one-to-one correspondence. A memory address corresponding to a synthesis position is set at a predetermined position.

In addition, the data storage areas in the synthesis format data storage section 528 and the image areas of picked-up image data obtained in the control section 521 through the CCD 523 are arranged in one-to-one correspondence.

The data synthesizing section 529 serves to synthesize the picked-up image data, obtained in the control section 521 upon operation of the shutter 512, with the synthesized format data, stored in the synthesis format data storage section 528, in units of horizontal line data. The synthesized image data sequentially obtained by the data synthesizing section 529 are stored in the printing butter 530 in units of line data. The image data are then transferred to the printing portion 513 to be printed on recording paper sheets P.

An operation of the electronic image pickup apparatus having the above arrangement will be described below.

Figure 29:
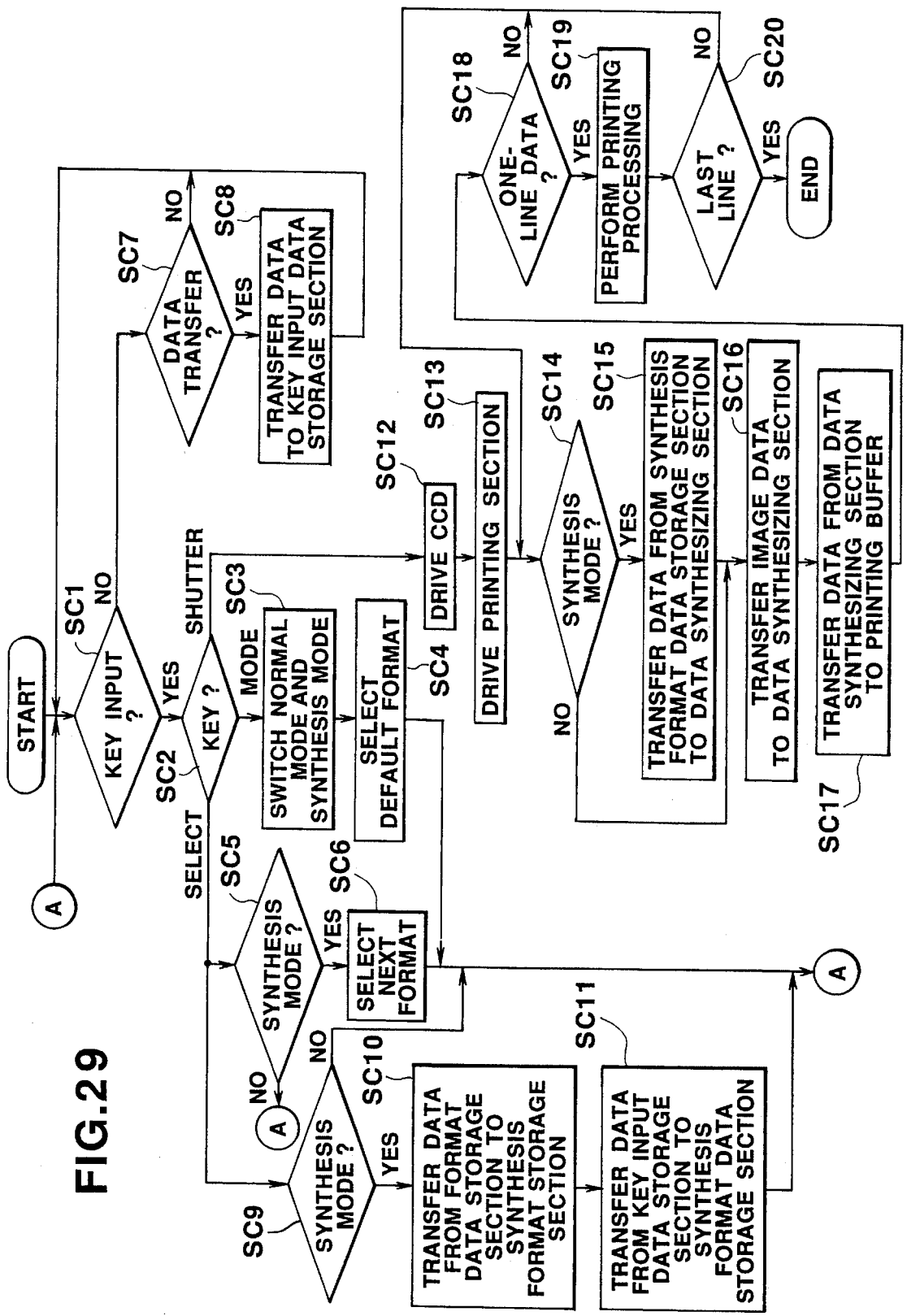
FIG. 29 is a flow chart showing image data recording/printing processing in the embodiment.

FIG. 29 is a flow chart showing image data recording/printing processing performed by the electronic image pickup apparatus.

FIG. 30 shows character information on a blackboard as an object to be photographed by the electronic image pickup apparatus.

FIG. 31 shows the object image recorded/printed by the electronic image pickup apparatus.

Assume that the character information on the blackboard shown in FIG. 30 is recorded/printed as minutes to be directly used as materials. In this case, when the mode key 514 is operated to set the synthesis mode, a preset initial format is selected from a plurality of types of format data stored in the format data storage section 526 by the control section 521, and the corresponding format name is displayed on the display portion 519 (steps SC1 to SC4).

If the select key 515 is operated when the format name selected/displayed on the display portion 519 is not a minutes format, the control section 521 determines that the current operation mode is the synthesis mode, and other format data to be stored in the format data storage section 526 are sequentially selected and displayed in accordance with operation of the select key 515 (steps SC1, SC2, SC5, and SC6).

After a desired minutes format is selected, a title "Lx-999 SCHEDULE.ORGANIZE MEETING" is input by using the external information processing unit 516 such as a personal computer to be synthesized/written in an item entry space (predetermined position) of the minutes format. When this key input data is input through the external input terminal 517, the key input data "Lx-999 SCHEDULE.ORGANIZE MEETING" is transferred to the control section 521 through the data transfer control section 531 and is stored in a predetermined storage area in the key input data storage section 527 (steps SC1, SC7, and SC8).

When the execution key 518 is operated at this time, the control section 521 determines that the current operation mode is the synthesis mode. As a result, the minutes format data selected beforehand in step SC6 is read out from the format data storage section 526 and is transferred to the synthesis format data storage section 528. At the same time, the key input data "Lx-999 SCHEDULE.ORGANIZE MEETING" stored beforehand in the key input data storage section 527 in step SC8 is also read out and transferred to the synthesis format data storage section 528 (steps SC1, SC2, SC9, SC10, and SC11).

In this case, the minutes format data and the key input data "Lx-999 SCHEDULE.ORGANIZE MEETING" are synthesized and stored.

While the minutes format synthesized with the title "Lx-999 SCHEDULE.ORGANIZE MEETING" is held in the synthesis format data storage section 528, the shutter 512 is operated, and an image of the character information on the blackboard shown in FIG. 30 is formed, as an object image, by the CCD 523 through the image pickup lens 511. As a result, image data corresponding to the object image is transferred to the control section 521 through the binary circuit 524 and the serial/parallel conversion section 525, and driving of the printing portion 513 is started (steps SC1, SC2, SC12, and SC13).

When the control section 521 determines that the current operation mode is the synthesis mode, the synthesized format data held in the synthesis format data storage section 528 in advance and the image transferred to the control section 521 are transferred to the data synthesizing section 529 in units of horizontal line data to be synthesized (steps SC14 to SC16).

When one-line synthesized data obtained by synthesizing the image data and the format data in the data synthesizing section 529 is transferred to the printing butter 530, the one-line data is transferred from the printing butter 530 to the printing portion 513 and is printed on the paper P (steps SC17 to SC19).

Subsequently, when the control section 521 determines that the print data in the printing portion 513 is not the last line, the synthesis mode is determined again, and synthesis processing of the image data transferred to the control section 521 and the synthesized format data stored in the synthesis format data storage section 528 is performed by the data synthesizing section 529, while printing of the resultant synthesized data is performed by the printing portion 513. This processing is repeated in units of line data up to the last line (steps SC14 to SC20).

In this manner, image data obtained by synthesis of character information picked up from the blackboard as shown in FIG. 31 with a minutes format is printed.

According to the electronic image pickup apparatus having the above arrangement, minutes format data stored beforehand in the format data storage section 526 and title data stored beforehand in the key input data storage section 527 are synthesized and stored in the synthesis format data storage section 528, and an image of character information on a blackboard which is formed on the CCD 523 through the image pickup lens 511 is transferred, as image data, to the control section 521 through the binary circuit 524 and the serial/parallel conversion section 525. The image data transferred to the control section 521 and the format data held in the synthesis format data storage section 528 are sequentially synthesized in units of line data by the data synthesizing section 529, and the resultant image is printed by the printing portion 513 through the printing butter 530. Therefore, a cumbersome operation of writing frames, a title, and the like on recording paper upon image pickup/printing processing of the blackboard information can be omitted, and documents which can be directly used as materials can be easily obtained.

In the above-described second embodiment, key input data to be synthesized with format data in advance is input from the external information processing unit 516 through the external input terminal 517. However, this key input section for synthesis key input data may be integrated with the main body case 510.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electronic image pickup apparatus, comprising:

image data creating means for outputting image data in units of lines by forming an object image and scanning an image formation plane of an optical system using a line sensor;

a focus screen, for forming said object image in an image formation position, said focus screen being movable to said image formation position and to a retreat position where said object image is retreated from said image formation position;

a mirror movable to a reflection position where said object image formed on said focus screen is reflected on a finder for monitoring said object image, and to a shielding position where a light from said finder is shielded;

driving means for respectively driving said focus screen to said retreat position and said mirror to said shielding position when an image picking up operation of said image data creating means is started, and for respectively driving said focus screen to said image formation position and said mirror to said reflection position when said image picking up operation is finished;

a line buffer for storing one-line image data output by said image data creating means;

data generating means for generating data to be synthesize with the image data, in units of lines;

Synthesized data creating means for creating synthesized data by synthesizing the one-line data generated by said data generating means with one-line image data output by said image data creating means and stored in said line buffer; and synthesized data output means for outputting the synthesized data created by said synthesized data creating means.

2. An apparatus according to claim 1, wherein said image data creating means comprises enlargement processing means for enlarging the image data obtained in units of lines upon scanning of said line sensor.

3. An apparatus according to claim 2, wherein said enlargement processing means comprises:

clock output means for outputting a basic clock and a double sync clock having a frequency several times that of the basic clock, enlargement magnification input means for inputting an enlargement magnification for the image data obtained upon scanning of said line sensor, clock selecting means for selecting the basis clock and the double sync clock output from said clock output means on the basis of the enlargement magnification input from said enlargement magnification input means, and for outputting an enlargement clock, and latch means for latching and outputting the image data input from said image data input means in synchronism with the enlargement clock output from said clock selecting means.

4. An apparatus according to claim 1, wherein said image data creating means comprises binarization means for sequentially binarizing the image data obtained upon scanning of said line sensor.

5. An apparatus according to claim 4, wherein said binarization means comprises:

line detecting means for detecting a scanning line of said line sensor, dither pattern storage means for storing thresholds of a two-dimensional dither pattern, threshold designating means for designating a threshold, of the two-dimensional dither pattern, which corresponds to the scanning line detected by said line detecting means, in said dither pattern storage means, and binarization means for sequentially binarizing the image data, obtained upon scanning of said line sensor, on the basis of the threshold, of the two-dimensional dither pattern, which is designated by said threshold designating means.

6. An apparatus according to claim 1, wherein said data generating means includes a memory for prestoring the data to be synthesized.

7. An apparatus according to claim 6, wherein the data stored in said memory includes cutting line data for transferring cutting lines indicating a boundary of a frame when a one-frame image is transferred by an external printer on the basis of the synthesized data.

8. An apparatus according to claim 6, wherein said memory stores a plurality of types of data to be synthesized, and further comprises selection means for selecting one of the plurality of types of data.

9. An apparatus according to claim 1, wherein said data generating means includes an external information processing unit connected to said electronic image pickup apparatus.

10. An electronic image pickup apparatus, comprising:

image data creating means for outputting image data in units of lines by moving on an image formation plane of an optical system and scanning said image formation plane using a line sensor so as to form said object image;

a focus screen, for forming said object image in an image formation position, said focus screen being movable to said image formation position and to a retreat position where said object image is retreated from said image formation position;

a mirror movable to a reflection position where said object image formed on said focus screen is reflected on a finder for monitoring said object image, and to a shielding position where a light from said finder is shielded;

driving means for respectively driving said focus screen to said retreat position and said mirror to said shielding position when an image picking up operation of said image data creating means is started, and for respectively driving said focus screen to said image formation position and said mirror to said reflection position when said image picking up operation is finished;

a line buffer for storing one-line image data output by said image data creating means;

data generating means for generating one-line image data to be synthesized with the one-line image data stored in said line buffer;

a data buffer for storing at least part of the data generated by said data generating means;

synthesized data creating means for creating synthesized data by synthesizing the one-line data generated by said data generating means with one-line image data output by said image data creating means and stored in said line buffer; and synthesized data output means for outputting the synthesized data created by said synthesized data creating means.

11. An apparatus according to claim 10, wherein said synthesized data creating means creates the synthesized data by repeatedly using the data stored in said data buffer.

12. An apparatus according to claim 10, wherein said image data creating means comprises enlargement processing means for enlarging the image data obtained in units of lines upon scanning of said line sensor.

13. An apparatus according to claim 12, wherein said enlargement processing means comprises:

clock output means for outputting a basic clock and a double sync clock having a frequency several times that of the basic clock, enlargement magnification input means for inputting an enlargement magnification for the image data obtained upon scanning of said line sensor, clock selecting means for selecting the basis clock and the double sync clock output from said clock output means on the basis of the enlargement magnification input from said enlargement magnification input means, and for outputting an enlargement clock, and latch means for latching and outputting the image data input from said image data input means in synchronism with the enlargement clock output from said clock selecting means.

14. An apparatus according to claim 10, wherein said image data creating means comprises binarization means for sequentially binarizing the image data obtained upon scanning of said line sensor.

15. An apparatus according to claim 14, wherein said binarization means comprises;

line detecting means for detecting a scanning line of said line sensor, dither pattern storage means for storing thresholds of a two-dimensional dither pattern, threshold designating means for designating a threshold, of the two-dimensional dither pattern, which corresponds to the scanning line detected by said line detecting means, in said dither pattern storage means, and binarization means for sequentially binarizing the image data, obtained upon scanning of said line sensor, on the basis of the threshold, of the two-dimensional dither pattern, which is designated by said threshold designating means.

16. An apparatus according to claim 10, wherein said data generating means includes a memory for prestoring the data to be synthesized.

17. An apparatus according to claim 16, wherein the data stored in said memory includes cutting line data for transferring cutting lines indicating a boundary of a frame when a one-frame image is transferred by an external printer on the basis of the synthesized data.

18. An apparatus according to claim 16, wherein said memory stores a plurality of types of data to be synthesized, and further comprises selection means for selecting one of the plurality of types of data.

19. An apparatus according to claim 10, wherein said data generating means includes an external information processing unit connected to said electronic image pickup apparatus.

20. An electronic image pickup apparatus, comprising:

image pickup means for picking up an object image on an image formation plane of an optical system by moving said image formation plane of said optical system;

a focus screen, for forming said object image in an image formation position, said focus screen being movable to said image formation position, and to a retreat position where said object image is retreated from said image formation position;

a mirror movable to a reflection position where said object image formed on said focus screen is reflected on a finder for monitoring said object image, and to a shielding position where a light from said finder is shielded;

driving means for respectively driving said focus screen to said retreat position and said mirror to said shielding position when an image picking up operation of said image pickup means is started, and for respectively driving said focus screen to said image formation position and said mirror to said reflection position when said image picking up operation is finished.

21. An electronic image pickup apparatus according to claim 20, wherein said focus screen and said mirror overlap with each other at said retreat position and said shielding position.

22. An electronic image pickup apparatus according to claim 20, wherein said object image on said image formation plane is picked up by said pickup means after said focus screen and said mirror are respectively driven to said retreat position and said shielding position by said driving means.

23. An electronic image pickup apparatus according to claim 20, further comprising a liquid crystal display device arranged close to said focus screen.

* * * * *